United States Patent
Yokoi et al.

(10) Patent No.: US 9,009,486 B2
(45) Date of Patent: Apr. 14, 2015

(54) BIOMETRIC AUTHENTICATION APPARATUS, BIOMETRIC AUTHENTICATION METHOD, AND COMPUTER READABLE STORAGE MEDIUM

(75) Inventors: Hironori Yokoi, Akashi (JP); Toshio Endoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 13/242,957

(22) Filed: Sep. 23, 2011

(65) Prior Publication Data

US 2012/0013437 A1 Jan. 19, 2012

Related U.S. Application Data

(63) Continuation of application No. PCT/JP2009/058398, filed on Apr. 28, 2009.

(51) Int. Cl.
*G06F 21/00* (2013.01)
*G06F 21/32* (2013.01)
(Continued)

(52) U.S. Cl.
CPC .............. *G06F 21/32* (2013.01); *H04L 63/08* (2013.01); *H04L 9/32* (2013.01); *G06F 21/31* (2013.01); *H04L 63/0861* (2013.01); *G06F 21/30* (2013.01); *H04L 9/0866* (2013.01);
(Continued)

(58) Field of Classification Search
CPC .......... G06F 21/30; G06F 21/31; G06F 21/32
USPC ................. 726/1–21; 713/155–170, 182–186
See application file for complete search history.

(56) References Cited

U.S. PATENT DOCUMENTS 7,120,607 B2 * 10/2006 Bolle et al. ...................... 705/64
7,406,601 B2 * 7/2008 Hamid ........................... 713/186
(Continued)

FOREIGN PATENT DOCUMENTS

JP 2001-251295 9/2001
JP 2001-331446 11/2001
(Continued)

OTHER PUBLICATIONS

Abdel-Mottaleb, Mohamed, and Jindan Zhou. "Human ear recognition from face profile images." Advances in biometrics. Springer Berlin Heidelberg, 2005. 786-792.*
(Continued)

*Primary Examiner* — Madhuri Herzog
(74) *Attorney, Agent, or Firm* — Staas & Halsey LLP

(57) ABSTRACT

An authentication processing device receives biometric data to be checked from a biometric measuring device; transforms the biometric data that is input from the biometric measuring device by using a checking transformation parameter that is different from a registration transformation parameter; and creates checking biometric data. Then, the authentication processing device performs a differential transformation process on the created checking biometric data by using a differential parameter by which a transformation state transformed by the checking transformation parameter and a transformation state transformed by the registration transformation parameter have the same state. Thereafter, the authentication processing device checks the transformed checking biometric data against the registration biometric data stored in a transformation registration data DB and performs authentication.

10 Claims, 18 Drawing Sheets

(51) Int. Cl.
  *H04L 29/06* (2006.01)
  *H04L 9/32* (2006.01)
  *G06F 21/31* (2013.01)
  *G06F 21/30* (2013.01)
  *H04L 9/08* (2006.01)
  *G06K 9/00* (2006.01)
(52) U.S. Cl.
  CPC ........... *H04L9/0861* (2013.01); *G06K 9/00087* (2013.01); *G06K 9/00375* (2013.01); *G06K 9/00382* (2013.01); *G06K 2009/00953* (2013.01); *G06K 9/00067* (2013.01); *G06K 9/00006* (2013.01); *H04L 9/3231* (2013.01)

(56) References Cited

U.S. PATENT DOCUMENTS

| | | | |
|---|---|---|---|
| 2003/0039382 A1* | 2/2003 | Yau et al. | 382/125 |
| 2004/0193893 A1* | 9/2004 | Braithwaite et al. | 713/186 |
| 2006/0117188 A1* | 6/2006 | Fiske et al. | 713/186 |
| 2008/0037833 A1 | 2/2008 | Takahashi et al. | |
| 2008/0178002 A1 | 7/2008 | Hirata et al. | |
| 2008/0178008 A1 | 7/2008 | Takahashi et al. | |
| 2009/0033461 A1* | 2/2009 | Chabanne | 340/5.82 |
| 2009/0070860 A1 | 3/2009 | Hirata et al. | |
| 2009/0123034 A1* | 5/2009 | Bolle et al. | 382/115 |
| 2010/0066493 A1* | 3/2010 | Rachlin | 340/5.82 |

FOREIGN PATENT DOCUMENTS

| | | |
|---|---|---|
| JP | 2003-108526 | 4/2003 |
| JP | 2007-293807 | 11/2007 |
| JP | 2008-092413 | 4/2008 |
| JP | 2008-097438 | 4/2008 |
| JP | 2008-129743 | 6/2008 |
| JP | 2009-064202 | 3/2009 |

OTHER PUBLICATIONS

Ratha, Nalini, et al. "Cancelable biometrics: A case study in fingerprints." Pattern Recognition, 2006. ICPR 2006. 18th International Conference on. vol. 4. IEEE, 2006.*
International Search Report mailed May 26, 2009 in corresponding International Application No. PCT/JP2009/058398.
International Search Report, mailed May 26, 2009, in International Application No. PCT/JP2009/058398 (3 pp.).
Written Opinion (Form PCT/ISA/237), mailed May 26, 2009, in International Application No. PCT/JP2009/058398 (3 pp.).

* cited by examiner

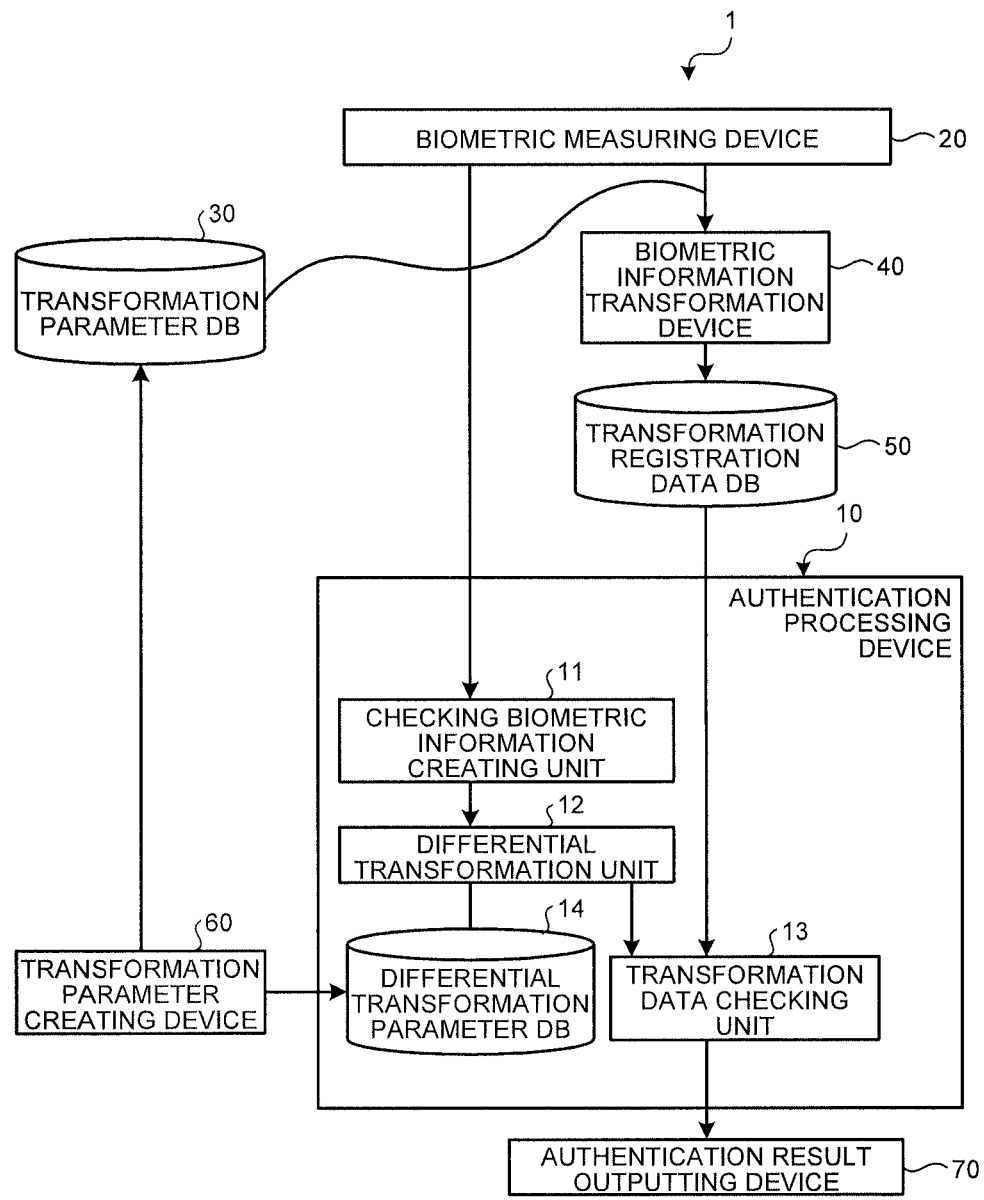

[APPLICABLE SCHEME]

PARTIAL CUT OUT — CUT-OUT POSITION: n POSITIONS $(x_0, y_0), (x_1, y_1), ..., (x_{n-1}, y_{n-1})$ ※FIXED

↓

GEOMETRIC TRANSFORMATION (ROTATION) — ROTATION ANGLE: ELEMENT n $d_0, d_1, ..., d_{n-1}$

↓

ELEMENT SEQUENTIAL ORDER TRANSFORMATION — ID INTERCHANGE: ELEMENT n $(0, id_{10}), (1, id_{11}), ..., (n-1, id_{1n-1})$

FIG.18

<EXAMPLE OF ASSOCIATING IDs>
ASSOCIATE IDi10: TRANSFORMATION ID 0 WITH TRANSFORMATION ID OF ZEROTH ELEMENT IN REGISTRATION TRANSFORMATION PARAMETER: 1 ($IDr_{11}$)
ASSOCIATE IDi11: TRANSFORMATION ID 1 WITH TRANSFORMATION ID OF $1^{ST}$ ELEMENT IN REGISTRATION TRANSFORMATION PARAMETER: 0 ($IDr_{10}$)
:
ASSOCIATE IDi1n-5: TRANSFORMATION ID n-1 WITH TRANSFORMATION ID OF n-$5^{TH}$ ELEMENT IN REGISTRATION TRANSFORMATION PARAMETER: n-4 ($IDr1n_{-5}$)
ASSOCIATE IDi1n-4: TRANSFORMATION ID n-5 WITH TRANSFORMATION ID OF n-$4^{TH}$ ELEMENT IN REGISTRATION TRANSFORMATION PARAMETER: n-1 ($IDr1n_{-4}$)
:
ASSOCIATE IDi1n-1: TRANSFORMATION ID n-4 WITH TRANSFORMATION ID OF n-$1^{TH}$ ELEMENT IN REGISTRATION TRANSFORMATION PARAMETER: n-5 ($IDr1n_{-1}$)

FIG.19

<EXAMPLE OF DIFFERENCE ANGLE CALCULATION> dd0 = $dr_1 - di_1$ = (-40deg)-20deg=-60deg    BASED ON ASSOCIATION (1,0), $idr_{11}$=0, $idi_{11}$=1 dd1 = $dr_0 - di_0$=30deg-80deg=-50deg    BASED ON ASSOCIATION (0,1), $idr_{10}$=1, $idi_{10}$=0

⋮ ddn-5 = $dr_{n-1} - di_{n-1}$=125deg-(-10deg)=-190deg  BASED ON ASSOCIATION (n-4,n-5), $idr1_{n-1}$=n-5, $idi1_{n-1}$=n-4 ddn-4 = $dr_{n-5} - di_{n-5}$=(-20deg)-50deg=-70deg    BASED ON ASSOCIATION (n-1,n-4), $idr1_{n-5}$=n-4, $idi1_{n-5}$=n-1

⋮ ddn-1 = $dr_{n-4} - di_{n-4}$=90deg-170deg=-80deg    BASED ON ASSOCIATION (n-5,n-1), $idr1_{n-4}$=n-1, $idi1_{n-4}$=n-5

ID ASSOCIATION TABLE (0, 1), (1,0), ..., (n-4, n-5), (n-5, n-1), ..., (n-1, n-4)

ANGLE DIFFERENCE LIST (-60deg), (-50deg),..., (-190deg), (-70deg),..., (-80deg)

BIOMETRIC AUTHENTICATION APPARATUS, BIOMETRIC AUTHENTICATION METHOD, AND COMPUTER READABLE STORAGE MEDIUM

CROSS-REFERENCE TO RELATED APPLICATION

This application is a continuation of International Application No. PCT/JP2009/058398, filed on Apr. 28, 2009, the entire contents of which are incorporated herein by reference.

FIELD

The embodiments discussed herein are directed to a biometric authentication apparatus and a biometric authentication method that perform authentication by obtaining data on biometric features as checking data and by checking the checking data against registration data, and a computer readable storage medium that stores a biometric authentication program.

BACKGROUND

There is a conventional biometric authentication system for performing authentication by registering data on biometric features that are unique to individuals, such as data on fingerprints or veins, in a database in a server as registration data; obtaining, as checking data, biometric feature data obtained by a terminal; and checking the checking data against the registration data.

A technology for realizing such a biometric authentication system includes a method for encrypting and managing biometric feature data. A common encryption method guarantees security because an inverse operation is difficult due to enormous amount of calculations. However, when encryption data is stolen by an attacker, the encryption data can be decrypted in many cases if enormous amount of calculation resources and time are used. In such a case, because biometric feature data is usually unique to each individual and thus unchangeable, there is a problem in that an individual whose data is leaked may not use a system that uses biometric features in order to prevent unauthorized use of the system. To address this problem, a cancellable checking method is proposed as an example of the method for encrypting and managing the biometric feature data. The cancellable checking method is performed by transforming, at the time of encryption, biometric feature data using a certain type of parameter (transformation parameter), checking the transformed data without restoration, and changing an encryption method (transformation parameter) when the registration data is stolen. As a result, a person who becomes a target of impersonation due to the leakage of data can continue to use the system.

The cancellable checking method requires that registration data and checking data have the same transformation state. To address this problem, a technology that employs the same transformation parameter to make the transformation state the same is proposed as the easiest and simplest method.

Specifically, a server transforms biometric feature data to data that is hard to be decrypted by using a transformation parameter and registers the transformed data in a database as registration data. Then, at the time of checking, a client device together reads, into a memory, the registration data and the transformation parameter that is used for transforming the registration data. Then, the client device transforms checking data by using the read transformation parameter, checks the transformed checking data against the registration data, and performs the authentication.

Furthermore, the cancellable checking method includes a technology for using different transformation parameters for registration data and checking data and transforming the registration data and checking data by using different inverse transformation parameters to perform checking (see Patent Literature 1).

Specifically, a server transforms biometric feature data by using a first transformation parameter and registers it in a database as registration data. Then, a client device transforms checking data by using a second transformation parameter that is different from the first transformation parameter and reads, into a memory, a transformation parameter that is the inverse of the first transformation parameter and a transformation parameter that is the inverse of the second transformation parameter. Then, the client device transforms the registration data and the transformed checking data by using the respective inverse transformation parameters, checks the checking data against the registration data in the same transformation state, and performs the authentication.

Patent Literature 1: Japanese Laid-open Patent Publication No. 2008-097438

However, in the technology, used in the cancellable checking method described above, for using the same transformation parameter for both the registration data and the checking data, a device, such as a client device, that performs a transformation process reads the transformation parameter into its memory and refers to the read parameter every time biometric feature data is transformed at the checking, which is performed in an environment in which monitoring is difficult; therefore, there is a high risk of the transformation parameter being stolen. Accordingly, when the transformation parameter is stolen, the biometric feature data may possibly be restored by using the stolen transformation parameter, and thus there is a problem in that the security of registered biometric data is questionable.

Furthermore, in the technology, used in the cancellable checking method described above, for using different transformation parameters for registration data and checking data, because a device, such as a server, that performs checking reads an inverse transformation parameter of registration data into a memory near the device and refers to the read data, the transformation parameter of the registration data may possibly be stolen. Accordingly, if an inverse transformation parameter is leaked due to, for example, theft, the biometric feature data may possibly be restored by using the stolen inverse transformation parameter, and thus there is a problem in that the security of the registered biometric data may not be ensured.

Furthermore, in the technology, used in the cancellable checking method described above, for using different transformation parameters for registration data and checking data, because the device transforms registration data by using a transformation parameter every time the checking is performed, the device transforms N pieces of registration data and performs the checking by using the transformed N pieces of registration data when performing one-to-N checking, for example. Accordingly, there is a problem in that the load of the checking process increases, a high-speed checking process may not be performed, and furthermore the server cost, such as the cost of calculation resources, becomes extremely high.

SUMMARY

According to an aspect of an embodiment of the invention, a biometric authentication apparatus transforms checking biometric information by using a differential transformation variable by which a transformation state transformed by a first transformation variable and a transformation state transformed by a second transformation variable have a same state and checks the transformed checking biometric information against registration biometric information in order to perform authentication.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 11 is a block diagram illustrating the configuration of the authentication processing device according to the first embodiment;

FIG. 12 is a schematic diagram illustrating an example of a differential parameter;

FIG. 18 is a schematic diagram illustrating an example of IDs associated with each other;

FIG. 19 is a schematic diagram illustrating an example of difference angle calculation;

DESCRIPTION OF EMBODIMENTS

Preferred embodiments of the present invention will be described in detail below with reference to the accompanying drawings.

[a] First Embodiment

In the following embodiments, the outline, the configuration, and the flow of the processing of an authentication processing device according to the first embodiment will be described in this order. Finally, an advantage of the first embodiment will be described. In the following, a case will be described in which a transformation registration data DB that stores therein registration biometric data is arranged outside the authentication processing device; however, the authentication processing device may include the transformation registration data DB.

Outline of Authentication Processing Device According to First Embodiment

Figure 1:
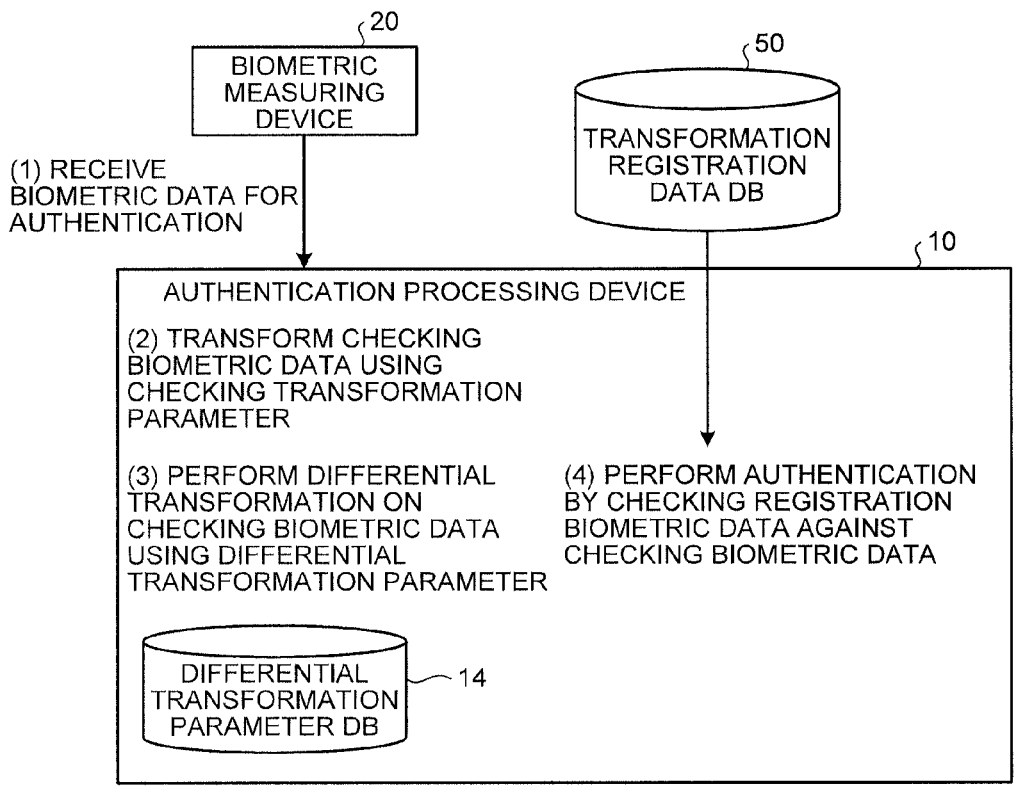
FIG. 1 is a schematic diagram illustrating the outline of an authentication processing device according to a first embodiment.
Figure 2:
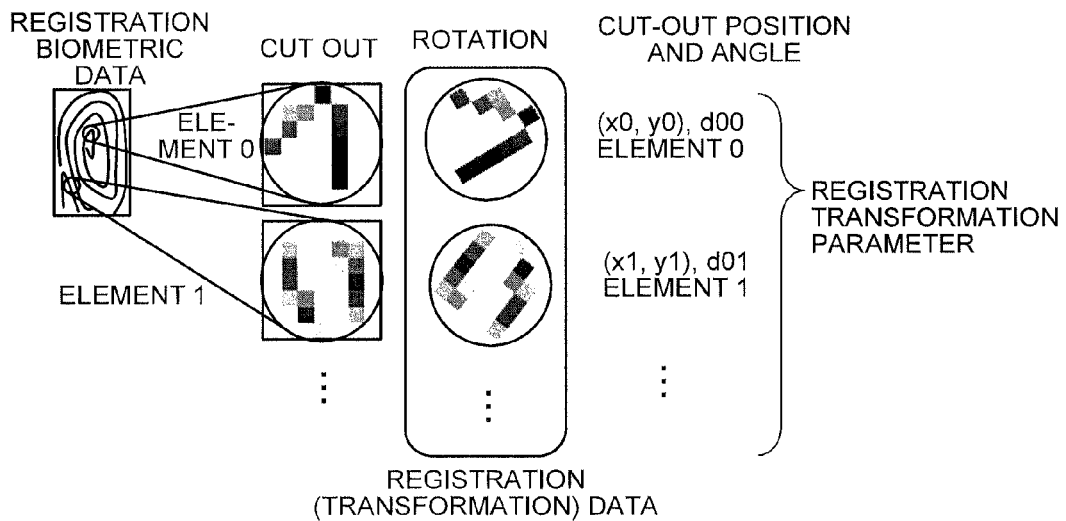
FIG. 2 is a schematic diagram specifically illustrating a transformation process performed on registration biometric data.
Figure 3:
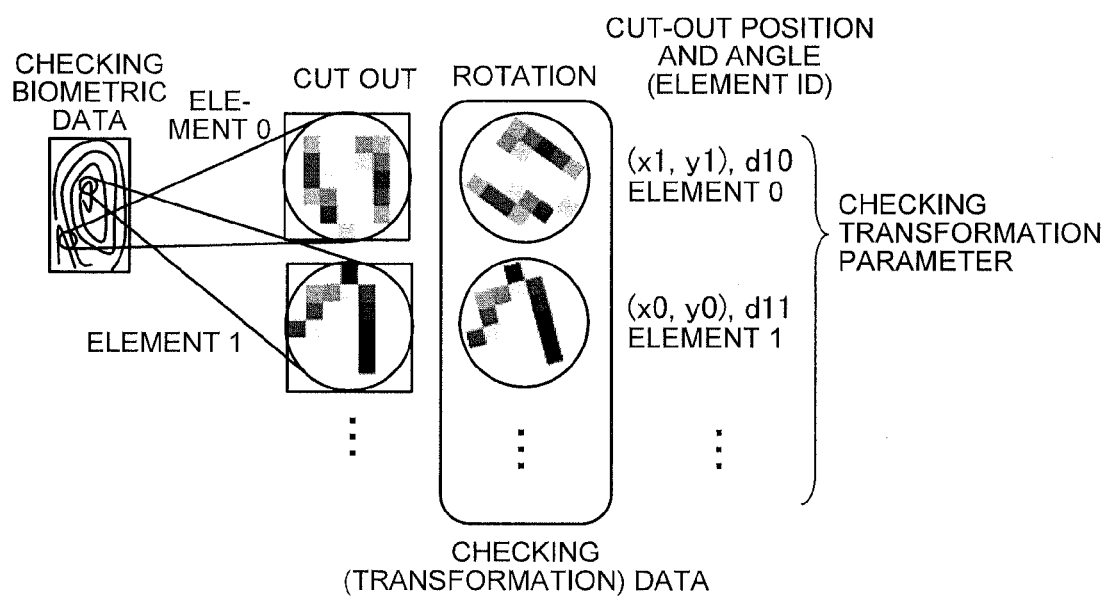
FIG. 3 is a schematic diagram specifically illustrating a transformation process performed on checking biometric data.
Figure 4:
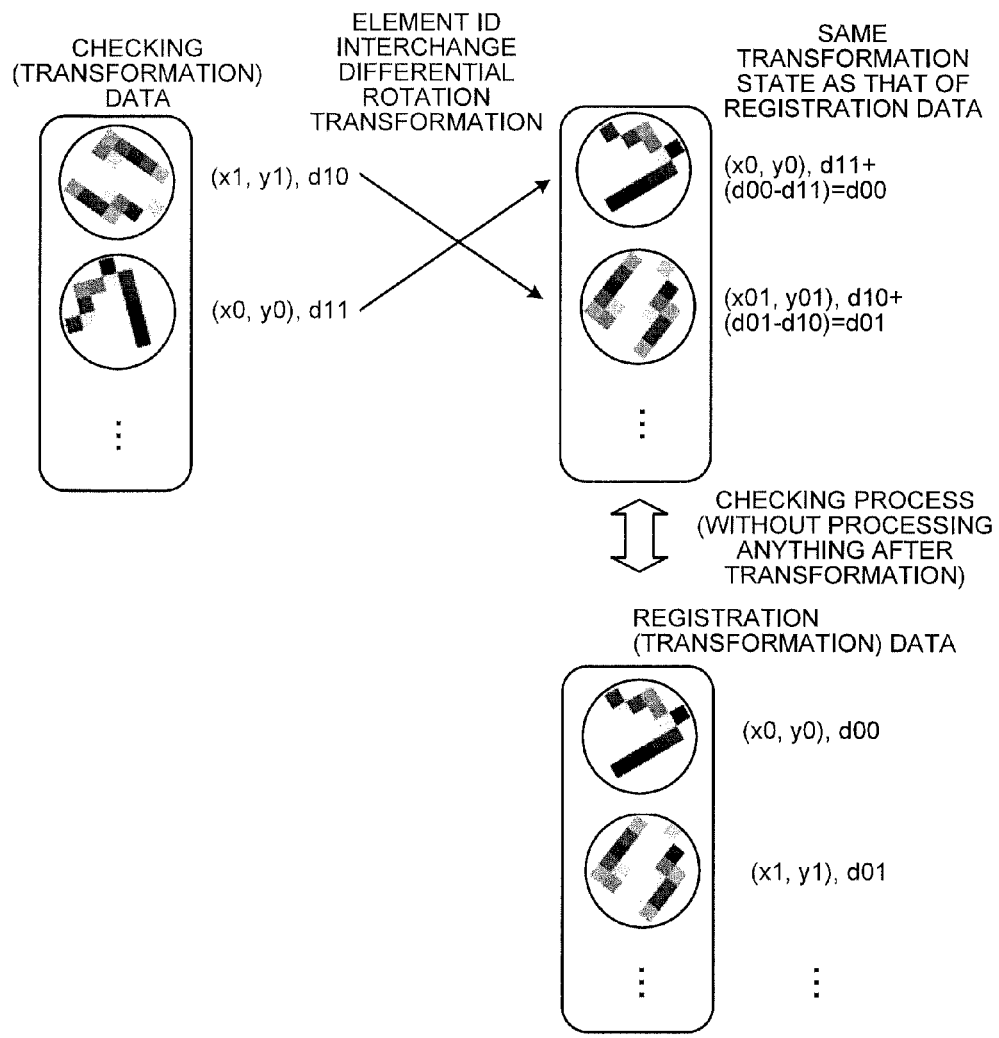
FIG. 4 is a schematic diagram specifically illustrating a differential transformation process.

First, the outline of the authentication processing device according to the first embodiment will be described with reference to FIGS. 1 to 4. FIG. 1 is a schematic diagram illustrating the outline of the authentication processing device according to the first embodiment. FIG. 2 is a schematic diagram specifically illustrating a transformation process performed on registration biometric data. FIG. 3 is a schematic diagram specifically illustrating a transformation process performed on checking biometric data. FIG. 4 is a schematic diagram specifically illustrating a differential transformation process.

An authentication process system according to the first embodiment registers, as registration data, biometric feature data that are unique to individuals, such as data on fingerprints or veins, in a database in a server; obtains, as checking data, biometric feature data obtained by a terminal; and checks the checking data against the registration data in order to perform authentication.

A transformation registration data DB 50 of a biometric authentication system 1 stores therein biometric data, as registration biometric data, that is transformed by using a registration transformation parameter. For example, the transformation registration data DB 50 stores therein registration biometric data as illustrated in FIG. 2. The registration biometric data is obtained by a transformation method for cutting out a part (in the example illustrated in FIG. 2, the element ID "0" at the cut-out position (x0, y0) and the element ID "1" at the cut-out position (x1, y1)) of registration biometric data and rotating the elements by predetermined angles (in the example illustrated in FIG. 2, the angles "d00" and "d01"). In this case, the transformation parameter means a combination of the cut-out position and the rotation angle that correspond to each element according to the cut-out order (in the above example, the order of the element ID).

An authentication processing device 10 receives biometric data to be checked from a biometric measuring device 20 (see (1) in FIG. 1). Then, the authentication processing device 10 transforms the target biometric data received from the biometric measuring device 20 by using a checking transformation parameter that is different from the registration transformation parameter and creates checking biometric data (see (2) in FIG. 1).

Specifically, as illustrated in FIG. 3, the authentication processing device 10 creates checking biometric data by using a transformation method for cutting out the element ID "0" at the cut-out position (x1, y1) and the element ID "1" at the cut-out position (x0, y0) and rotating the elements by predetermined angles (in the example illustrated in FIG. 3, the angles "d10" and "d11").

Then, the authentication processing device 10 performs a differential transformation process on the created checking biometric data by using a differential parameter by which a transformation state transformed by the checking transformation parameter and a transformation state transformed by the registration transformation parameter have the same state (see (3) in FIG. 1). In the following, the differential parameter stored in a differential transformation parameter DB 14 of the authentication processing device 10 will be described.

For example, as illustrated in FIG. 12, which will be described later, the differential parameter includes an ID list representing an association relationship between the cut-out positions of the elements and a relative angle of the corresponding cut-out positions. Accordingly, the transformation state of the checking data and the transformation state of the registration data can have the same state by performing the transformation of the element ID and the rotation transformation.

As an example of the differential transformation process illustrated in FIG. 4, the authentication processing device 10 interchanges elements by using an element ID association table for the differential transformation parameter and performs the rotation transformation by using the difference angle parameters of the elements. By doing so, the authentication processing device 10 has the same transformation state of the checking data as that of the registration data.

Then, the authentication processing device 10 checks the transformed checking biometric data against the registration biometric data stored in the transformation registration data DB 50 to perform the authentication (see (4) in FIG. 1). Specifically, as illustrated in FIG. 4, the authentication processing device 10 checks whether the checking biometric data that is subjected to the differential transformation by using the differential parameter is the same as the registration data transformed by using the registration transformation parameter. If both data are the same, the authentication processing device 10 authenticates the validity of the checking biometric data.

In this way, because the differential transformation is performed by using the differential parameter, the authentication processing device 10 can perform the checking process without referring to the registration transformation parameter and without restoring the original biometric data at the time of checking. Accordingly, it is possible to prevent the transformation parameter from being leaked and thus enhance the security of the registered biometric data. Furthermore, there is no need to transform the registration data; therefore, it is possible to further reduce the processing load and thus to implement the checking process at high speed.

Configuration of Biometric Authentication System

Figure 5:
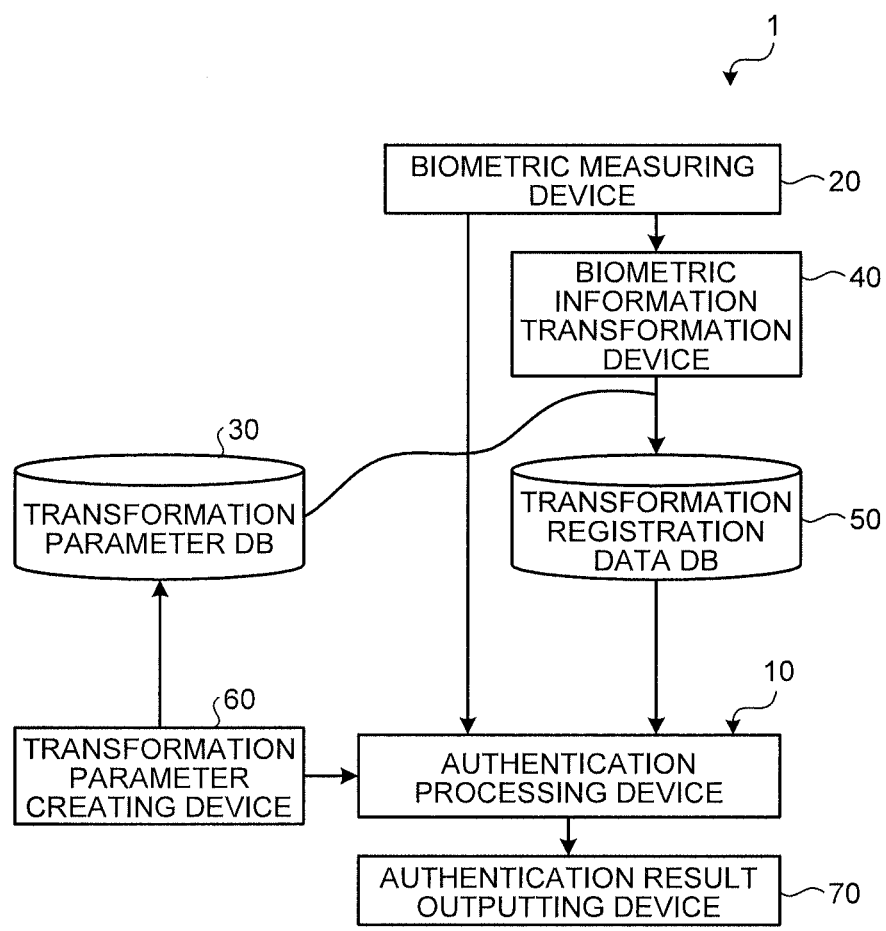
FIG. 5 is a block diagram illustrating the configuration of a biometric authentication system according to the first embodiment.

In the following, the configuration of the biometric authentication system 1 including the authentication processing device 10 illustrated in FIG. 1 will be described with reference to FIG. 5. FIG. 5 is a block diagram illustrating the configuration of a biometric authentication system according to the first embodiment. As illustrated in FIG. 5, the biometric authentication system 1 includes the authentication processing device 10, the biometric measuring device 20, a transformation parameter DB 30, a biometric information transformation device 40, the transformation registration data DB 50, a transformation parameter creating device 60, and an authentication result outputting device 70, all of which are connected via a network or the like. Each of the devices and the databases will be described below.

The authentication processing device 10 receives, from the biometric measuring device 20, checking biometric data to be checked and checks the received checking biometric data against registration biometric data that is read from the transformation registration data DB 50 in order to perform an authentication process. The authentication processing device 10 will be described in detail later with reference to FIG. 11.

The biometric measuring device 20 measures a biometric feature of the subject used for the authentication. The biometric measuring device 20 measures biological regions (modals) for authentication such as fingerprints or veins by using existing measuring devices, such as an image capturing device, which are suitable for the respective biological regions. The biometric feature data to be measured means a pattern that usually has a spatial phase (e.g., the distance between elements, an adjacent relationship, and the like).

Figure 6:
FIG. 6 is a schematic diagram illustrating an example of biometric feature data.

For example, as illustrated in FIG. 6, the biometric measuring device 20 obtains two-dimensional pattern data of a fingerprint as the biometric feature data to be measured. This is nothing more than the original data. When the checking is actually performed, the original pattern data is not always directly used as the feature data because, in many cases, extracted information, such as the interval between ridges, the shape, or the location or the number of breaks, is used or a combination thereof is used. This also applies to another modal, such as a vein pattern.

The transformation parameter DB 30 stores therein the registration transformation parameter that is created by the transformation parameter creating device 60. The transformation registration data DB 50 stores therein the registration biometric data that is transformed by the biometric information transformation device 40. The authentication result outputting device 70 outputs the result of the authentication process that is performed by the authentication processing device 10 as an authentication result.

The biometric information transformation device 40 transforms the biometric data measured by the biometric measuring device 20 by using the registration transformation parameter in such a manner that the original data is hard to be restored. Furthermore, the biometric information transformation device 40 holds a plurality of transformation parameters as the registration transformation parameter and transforms the biometric data by using any of the transformation variables. When the transformation states that correspond to the parameters are the same at the time of checking, the biometric information transformation device 40 performs the transformation such that the checking can be performed on the transformed biometric data without processing anything after transformation.

The transformation process of the biometric data includes several types of transformation processing methods. Each transformation processing method employs random numbers as the attribute. By using the random numbers as the attribute, a difficulty in restoring the data is guaranteed in terms of the amount of calculation and the complexity of each transformation processing method. The attribute represented by the random numbers in each transformation processing method is usually called a transformation parameter. There are several types of methods used for the transformation process and they are broadly classified into four: element extraction, geometric transformation, base transformation, and element interchange. In the following, the element extraction, the geometric transformation, the base transformation, and the element interchange will be described.

Figure 7:
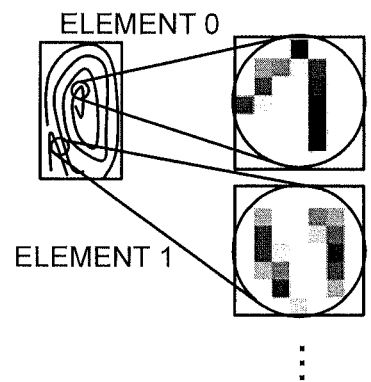
FIG. 7 is a schematic diagram illustrating an example of element extraction.

In an element extracting process, the biometric information transformation device 40 extracts a local region as an element. When extracting each element, the site, the size, the resolution, and the like are used for the attribute. For example, as illustrated in FIG. 7, a process for cutting out a plurality of local regions of the feature data corresponds to the element extracting process. The cut-out position, the order, the size, the resolution, and the like are used as the transformation parameter.

Figure 8:
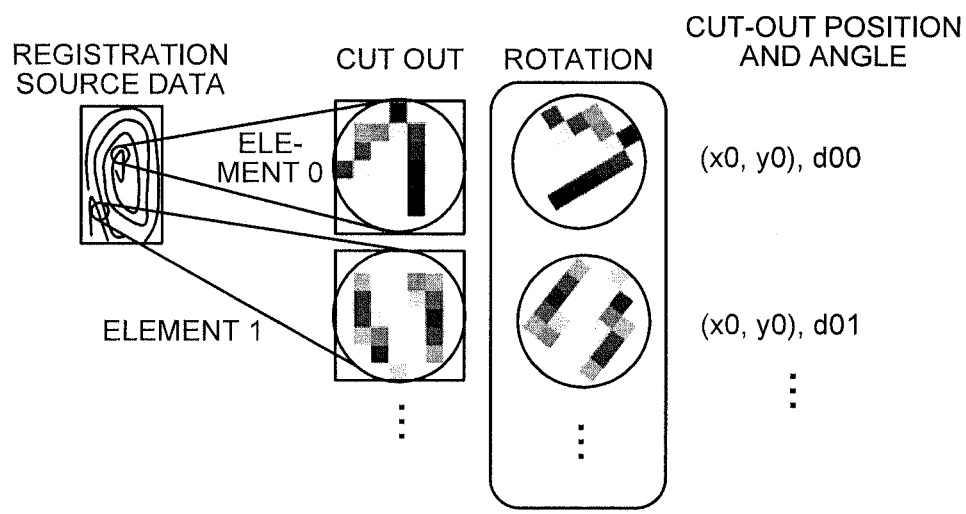
FIG. 8 is a schematic diagram illustrating an example of a geometric transformation (rotation of a fingerprint)
Figure 9:
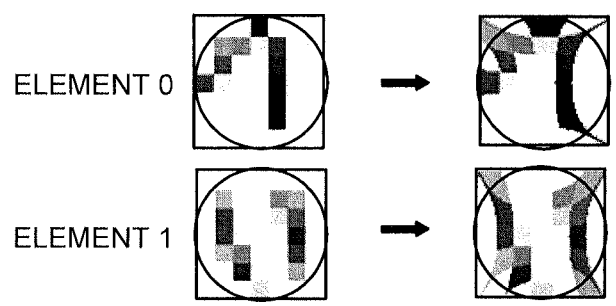
FIG. 9 is a schematic diagram illustrating an example of a geometric transformation (distortion of a fingerprint)

In a geometric transformation process, the biometric information transformation device 40 performs, on each element, the geometric transformation such as rotation and distortion in which a phase is maintained. In the following, an example of the geometric transformation process will be described in detail with reference to FIGS. 8 and 9. FIG. 8 is a schematic diagram illustrating an example of transformation (rotation) performed on each regional element that is cut out in FIG. 7. In this case, the rotation angle with respect to each regional element is used for the transformation parameter. FIG. 9 illustrates the distortion transformation performed on the regional element.

The geometric transformation is usually defined by the geometric transformation function at each point in the regional element. A phase-preserving existing geometric transformation is usually used for the geometric transformation function; however, the geometric transformation is not limited to the example described above and various transformation processes can be used. When implementing the geometric transformation, the geometric transformation can be defined by using a program representing the function in computing machine or by using a table storing therein an association relationship between sites of input elements. Additionally, a device other than the computing machine, such as an optical transformation device can be used.

In a base transformation process, the biometric information transformation device 40 performs a Fourier transformation or a wavelet transformation and performs mode extraction and decomposition on all of the elements. The biometric information transformation device 40 may employ a plurality of types of modes. In the base transformation, an element is extracted and decomposed into one or more elements. In the following, an element created in the base transformation process is referred to as a base element.

Furthermore, a combination of the base for each element to be transformed, such as a filter bank that is used for the extraction, is used for the attribute. For example, the base of the Gabor wavelet transformation that is one of the wavelets is given by Equation (1). In this case, the functional parameter, such as a frequency vector, is used for the transformation parameter. The wavelet is sometimes mathematically represented by a complex function; however, here, the wavelet is represented by a real function element that acts on the two-dimensional pattern.

$$g(x, y, \sigma, \beta, \xi, v) = c * \exp\left(-\left(\frac{x^2}{\sigma^2} + \frac{y^2}{\beta^2}\right)i(x\xi + yv)\right) \quad (1)$$

In the following, an example of a transformation using the base described above will be described. When performing the Gabor wavelet transformation on two-dimensional image data, the transformation process is represented by Equation (2) below, where f represents the entire pattern or a regional element, $\Omega$ represents a region to be transformed, xp and yp represent reference location coordinates of the base transformation, and v represents a complex number; however, a spectral function can also be used by further using an absolute value.

$$v(x_p, y_p, \sigma, \beta, \xi, v) = \int_\Omega f(x, y)g(x - x_p, y - y_p, \sigma, \beta, \xi, v)dxdy \quad (2)$$

Furthermore, when the base of the Fourier transformation is used for transformation, another typical example of a representative base transformation is the functions illustrated by Equations (3) and (4) below:

$$g_f(x, y, k_x, k_y) = c * \exp(i(k_x x + k_y y)) \quad (3)$$

$$v_f(x_p, y_p, k_x, k_y) = \int_\Omega f(x, y)g(x - x_p, y - y_p, k_x, k_y)dxdy \quad (4)$$

In the above example, the base element is a set of "$v(x_p, y_p, \sigma, \beta, \xi, v)$" or a set of "$v_f(x_p, y_p, k_x, k_y)$". The combination of the base parameters, such as arguments of the function, weighting of the coefficient, or the order of the elements to be extracted are used for the transformation parameter. For the configuration, the combination, and the implementation method of the base transformation described above, it is possible to use the existing methods that are improved in terms of speed or robustness.

Figure 10:
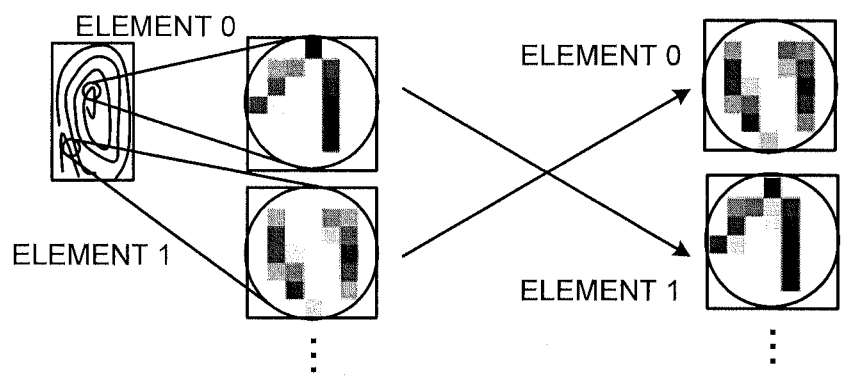
FIG. 10 is a schematic diagram illustrating an example of swapping elements.

In an element interchange process, the biometric information transformation device 40 interchanges the extracted and transformed elements (regional elements, base elements) with respect to the sequential order and ID. An association table for interchange is used for the attribute. For example, as illustrated in FIG. 10, the element 0 and the element 1 are interchanged. The element interchange process can usually be used when data is constituted from a plurality of elements and the sequential order or ID is given to the elements.

The transformation parameter creating device 60 creates the transformation parameter and the differential transformation parameter. The transformation parameter includes both a transformation scheme that represents the configuration of transformation means and a numerical sequence (random numbers) that represents a parameter for each the transformation means of the transformation scheme. The transformation parameter creating device 60 will be described in detail later with reference to FIG. 14.

Configuration of Authentication Processing Device

In the following, the configuration of the authentication processing device 10 illustrated in FIG. 1 will be described with reference to FIG. 11. FIG. 11 is a block diagram illustrating the configuration of the authentication processing device 10 according to the first embodiment. As illustrated in FIG. 11, the authentication processing device 10 includes a checking biometric information creating unit 11, a differential transformation unit 12, a transformation data checking unit 13, and the differential transformation parameter DB 14, all of which are connected to, via a network or the like, the biometric measuring device 20, the transformation parameter DB 30, the biometric information transformation device 40, the transformation registration data DB 50, the transformation parameter creating device 60, and the authentication result outputting device 70. Each of the units will be described below.

The differential transformation parameter DB 14 stores therein the differential parameter by which a transformation state transformed by the checking transformation parameter and a transformation state transformed by the registration transformation parameter have the same state. For example, as illustrated in FIG. 12, the differential transformation parameter DB 14 stores therein, as the differential parameter, the ID list representing an association relationship between the cut-out positions of the elements and the relative angle of the corresponding cut-out positions.

The checking biometric information creating unit 11 transforms the input biometric data to be checked by using the checking transformation parameter that is different from the registration transformation parameter and creates the checking biometric data. Specifically, the checking biometric information creating unit 11 receives the biometric data to be checked from the biometric measuring device 20.

Then, the checking biometric information creating unit 11 transforms the biometric data to be checked that is input from the biometric measuring device 20 by using the checking transformation parameter that is different from the registration transformation parameter; creates the checking biometric data; and transmits the created checking biometric data to the differential transformation unit 12.

For example, the checking biometric information creating unit 11 creates the checking biometric data as the checking transformation parameter by using local feature information that is biometric feature information on a local space containing a plurality of phases; a base coefficient obtained by performing the base transformation on the entire or the partial local space; a geometric transformation variable; or the sequential order of the elements of the biometric information, or any combination thereof.

The differential transformation unit 12 performs the differential transformation process on the created checking biometric data by using the differential parameter by which a transformation state transformed by the checking transformation parameter and a transformation state transformed by the registration transformation parameter have the same state.

Specifically, when receiving the checking biometric data from the checking biometric information creating unit 11, the differential transformation unit 12 reads the differential parameter from the differential transformation parameter DB 14. Then, the differential transformation unit 12 performs the differential transformation on the received checking biometric data by using the differential parameter and transmits the differential transformed checking biometric data to the transformation data checking unit 13.

In other words, the differential transformation unit 12 applies the differential parameter to the checking biometric data before the checking and makes the transformation state and the registration data the same. For example, in the example illustrated in FIG. 13, the differential transformation unit 12 performs the rotation transformation for interchanging the regional elements and the rotation angles of the regional elements in accordance with the association table and the difference rotation angles in the differential parameter. Specifically, the differential transformation unit 12 rotates the cut-out elements used for the checking by the differences of the rotation transformation parameter by using the created differential transformation parameter and associates, one to one by using the ID association table, the element used for the checking with the element used for the registration.

The transformation data checking unit 13 checks the differential transformed checking biometric data against the registration biometric data stored in the transformation registration data DB 50 in order to perform the authentication. Specifically, when receiving the differential transformed checking biometric data from the differential transformation unit 12, the transformation data checking unit 13 reads the registration biometric data from the transformation registration data DB 50 and checks the registration biometric data against the checking biometric data to perform the authentication. Then, the transformation data checking unit 13 transmits the authentication result to the authentication result outputting device 70.

Figure 13:
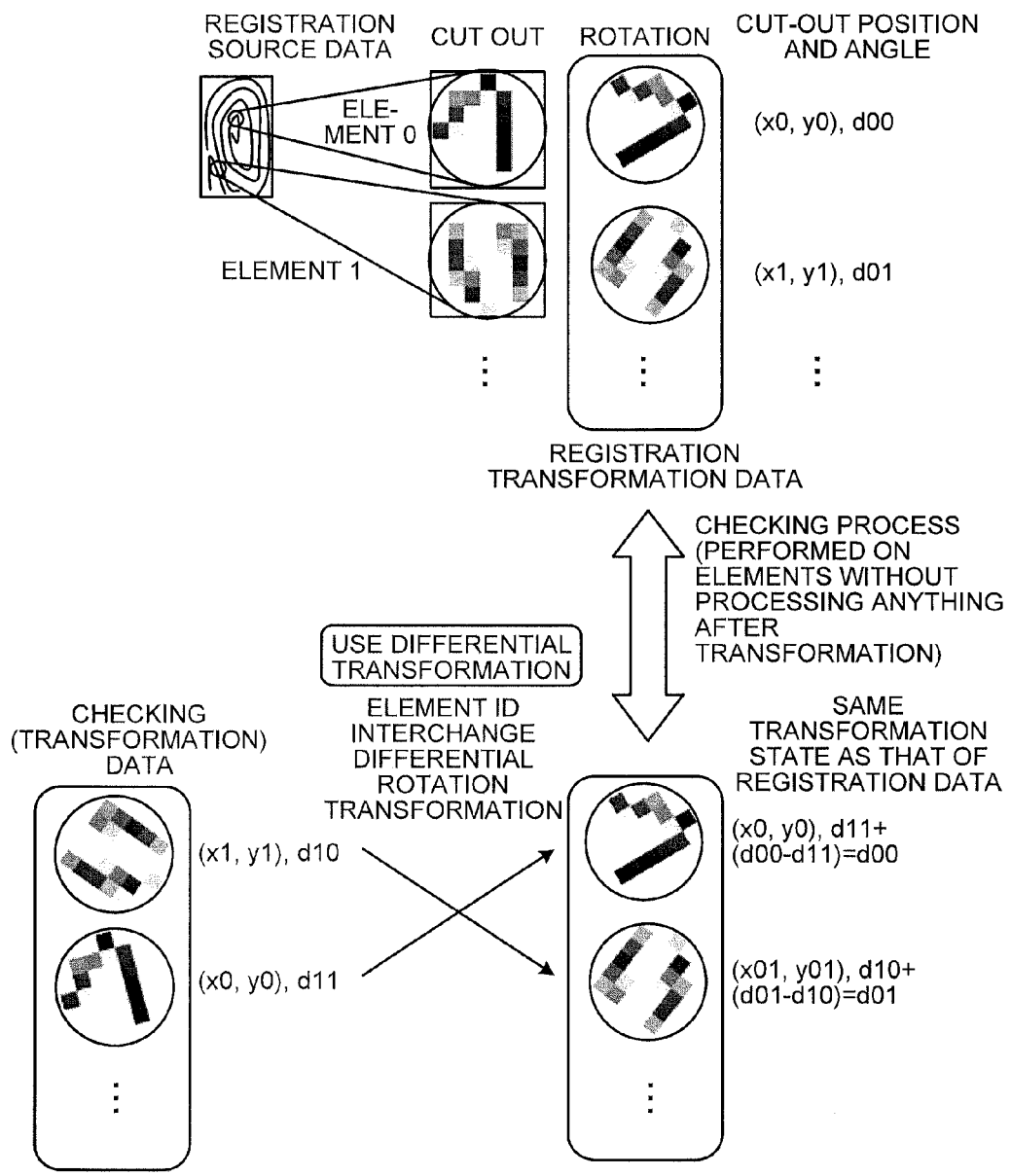
FIG. 13 is a schematic diagram illustrating an example of a differential transformation process.

As illustrated in FIG. 13, the checking biometric data and the registration biometric data are constituted from elements that are created and transformed in accordance with the scheme and the corresponding parameter. The transformation data checking unit 13 checks the transformed elements of the checking biometric data and the registration biometric data by using, for example, the existing pattern matching method in accordance with each element type. In the example illustrated in FIG. 13, the transformation data checking unit 13 performs the matching by allowing the regional elements to be slightly translated, calculates the similarity for each regional element, and outputs the sum of the similarities. Then, the transformation data checking unit 13 determines whether the sum of the similarities is equal to or greater than a threshold to determine the success or failure of the authentication.

Configuration of Transformation Parameter Creating Device

Figure 14:
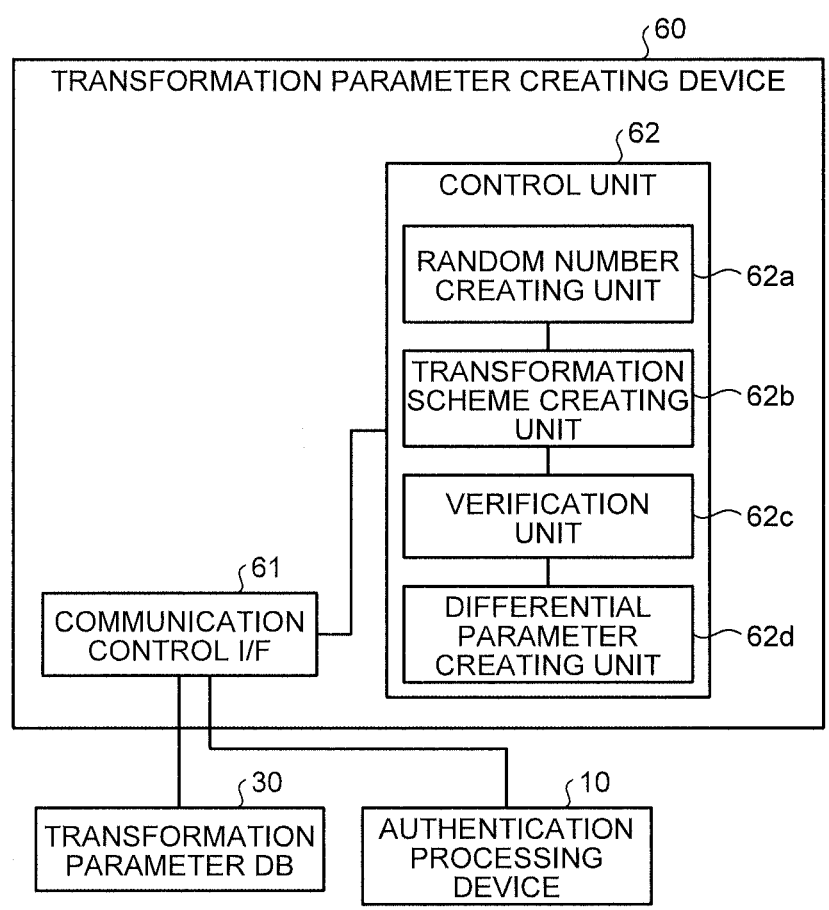
FIG. 14 is a block diagram illustrating the configuration of a transformation parameter creating device according to the first embodiment.

In the following, the configuration of the transformation parameter creating device 60 illustrated in FIG. 1 will be described with reference to FIG. 14. FIG. 14 is a block diagram illustrating the configuration of the transformation parameter creating device 60 according to the first embodiment. As illustrated in FIG. 14, the transformation parameter creating device 60 includes a communication control I/F 61 and a control unit 62, which are connected to, via a network or the like, the authentication processing device 10 and the transformation parameter DB 30. Each of the devices will be described below.

The communication control I/F 61 controls the communication related to various kinds of information exchanged between the authentication processing device 10 and the transformation parameter DB 30. Specifically, the communication control I/F 61 transmits the differential parameter to the authentication processing device 10 and transmits the transformation parameter to the transformation parameter DB.

The control unit 62 includes an internal memory that is used for storing therein needed data and programs prescribing various kinds of procedures and that executes various kinds of processes. The control unit 62 includes a random number creating unit 62a, a transformation scheme creating unit 62b, a verification unit 62c, and a differential parameter creating unit 62d. The transformation parameter is constituted by the transformation scheme that represents the configuration of the transformation means and the numerical sequence (random numbers) that represents a parameter of each the transformation means in the transformation scheme.

The random number creating unit 62a creates random numbers and inputs them to the transformation scheme creating unit 62b. Specifically, when creating the transformation parameters for checking and registration, the random number creating unit 62a randomly creates numerical parameter strings that are used to determine the transformation procedure for each step of the created transformation scheme. A random number table that is previously created can also be used for the random numbers.

The transformation scheme creating unit 62b creates the transformation scheme and the transformation parameter. For example, the transformation scheme creating unit 62b repeatedly selects, by using the random numbers, a transformation processing element that is previously prepared and randomly creates the structures of the transformation scheme. In this case, the type of the transformation process that is subsequently used for the transformation is limited in accordance with the output type of the transformation process. Therefore, the transformation scheme creating unit 62b performs the creation in the processing order within the limitations of the type of transformation process.

Specifically, if a plurality of regional elements or base elements appears as the result of the transformation, it is also possible to create the structure by branching off each element. In some cases, aggregation is performed depending on a checking method. In such a case, constraint is given to each creation step in such a manner that only the type of transformation process that can be aggregated is created. The flow of the transformation scheme creating process performed by the transformation scheme creating unit 62b will be described in detail later with reference to FIG. 23.

Figure 15:
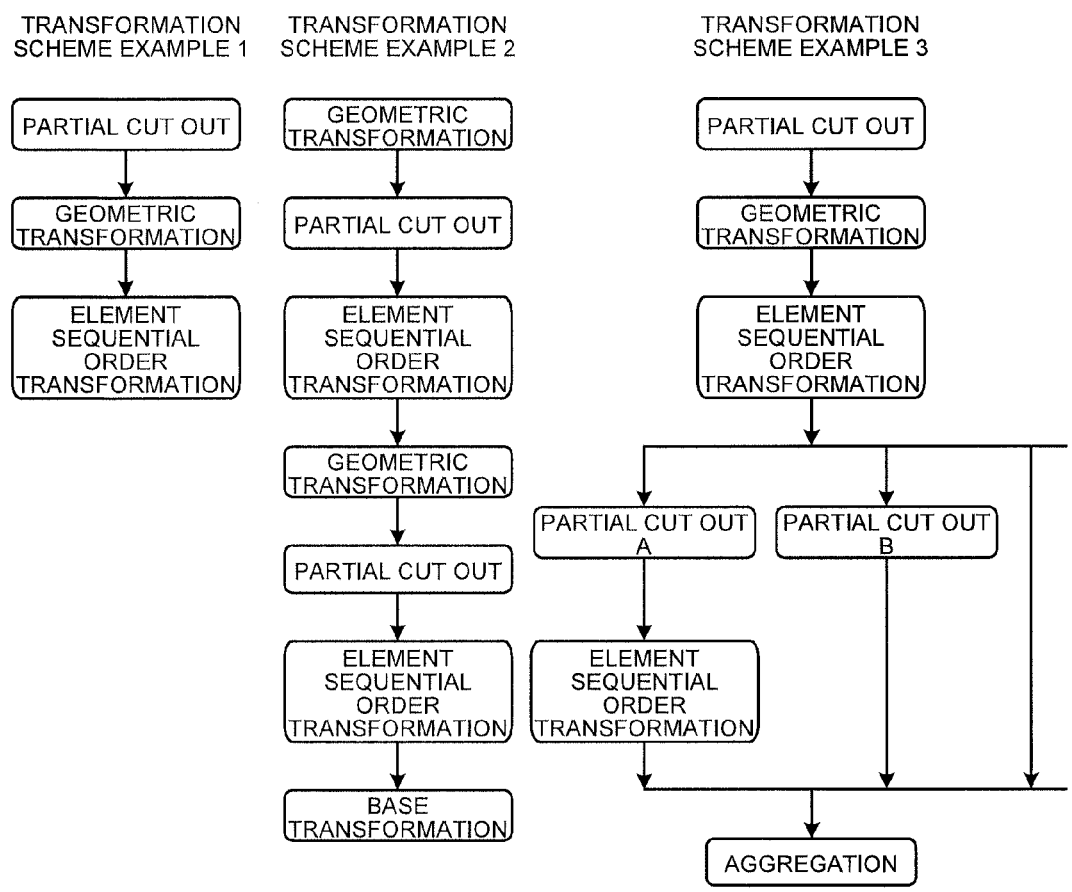
FIG. 15 is a schematic diagram illustrating an example of a transformation scheme.

An example of the transformation scheme created in this way is illustrated in FIG. 15. For example, as illustrated in FIG. 15, the transformation scheme is to define the order of the transformation processes and how to apply them. Each process is referred to as a transformation step. Herein, the transformation scheme represents only the block configuration of the transformation process. Therefore, each transformation process does not prescribe a specific transformation parameter, such as the target region and rotation angle in the geometric transformation.

At each transformation step, if a plurality of regional elements or base elements is created by the partial cut out or the base transformation, it is also possible to use a partial scheme, at the subsequent steps, in which a different transformation is performed on each element. However, the transformed data are eventually checked. Accordingly, when branching off the transformation scheme, aggregation is performed in which types of the transformation processes are made uniform at the subsequent step, or the types of branched transformation processing elements are stored and matched with each other when checking them.

Figures 16, 17:
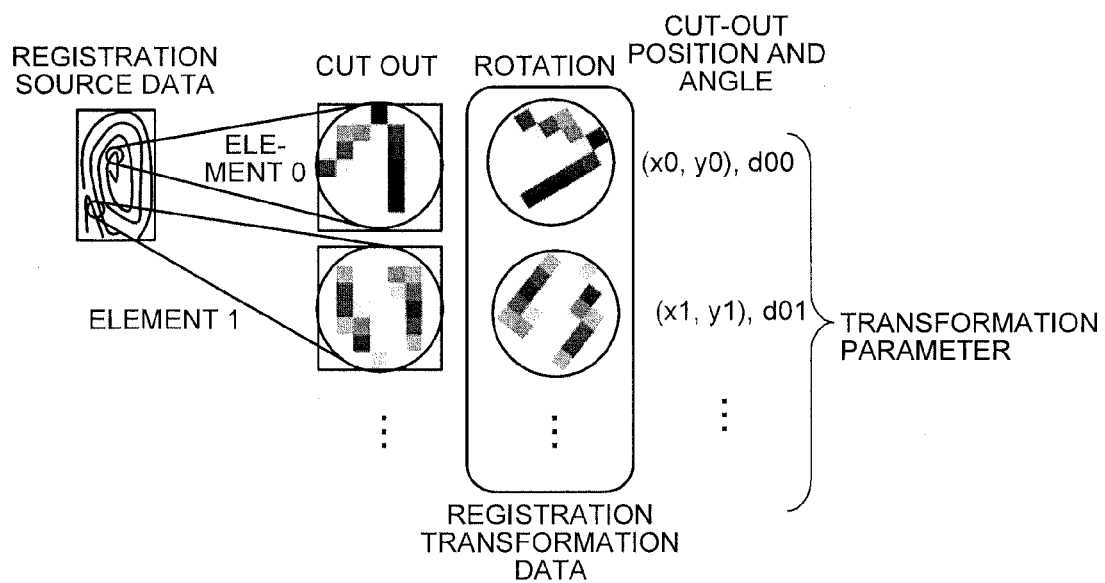
FIG. 16 is a schematic diagram illustrating an example of a transformation parameter.
FIG. 17 is a schematic diagram illustrating a specific example of creating the differential parameter.

Then, when creating the registration transformation parameter and the checking transformation parameter, at each step of the transformation scheme created in a manner described above, the transformation scheme creating unit 62b sequentially assigns random numbers received from the random number creating unit 62a to the numerical parameter string that is used to determine the flow of the transformation process at the step. For example, as illustrated in FIG. 16, the cut-out positions (the order) and the rotation angles of the regional elements are used for the transformation parameter.

When creating the transformation parameter, random numbers are sequentially allocated to the cut-out positions (or the order) and the numeric values of the rotation angles.

The transformation scheme and the transformation parameter created in this way are recorded and used for the transformation of the checking data and the registration data. However, when creating the registration parameter, it is preferable to define the differential parameter of the transformation parameter in the registration data. Accordingly, there is a constraint when creating the transformation scheme and the checking parameter.

Herein, the constraint at the time of creation of the transformation scheme will be described. When creating the transformation scheme, one or more steps in which the differential parameter can be used need to be present in the scheme. Accordingly, when creating each transformation step at the time of creation of the transformation scheme, the transformation scheme creating unit 62b checks the differential transformation potential for each transformation processing element. This checking process can be performed by using a combination of the types of the transformation processes performed at the current and previous steps and the determination result of the differential transformation potential performed at the previous step. In the following, the transformation parameter of a differential transformable element is referred to as a differential transformable parameter.

Specifically, in a process for checking the differential transformation potential, when the differential transformation is possible at the just previous step and when the types of the transformation process at the current and previous steps satisfy the differential reversibility, the transformation scheme creating unit 62b determines that the differential transformation is possible. In contrast, when the differential transformation is possible at the just previous step and when the types of the transformation process at the current and previous steps do not satisfy the differential reversibility, the transformation scheme creating unit 62b determines that differential transformation is impossible. Furthermore, when the differential transformation is impossible at the just previous step, the transformation scheme creating unit 62b also determines that the differential transformation is impossible.

The differential reversibility condition means that the differential transformations Pd0 and Pd1 of two given sets of transformation variables (P0, P1) and (P01, P11), which satisfy the property (transformability) illustrated in Equation (5) below, are present with respect to two transformation process types T0(P0) and T1(P1) and a given transformation target I. This is substantially the same as the reversibility condition illustrated in Equation (6) below (in many cases, a necessary and sufficient condition).

$$T_0(P_0) \cdot T_1(P_1) \cdot I = T_0(P_{d0}) \cdot T_1(P_{d1}) \cdot T_0(P_{01}) \cdot T_1(P_{11}) \cdot I \quad (5)$$

$$T_0(P_0) \cdot T_1(P_1) \cdot I = T_1(P_{11}) \cdot T_0(P_{01}) \cdot I \quad (6)$$

For example, a combination of the geometric transformations, such as the rotation and scaling, satisfies the above condition; however, the combination of the element extraction and the base transformation does not satisfy the above condition. When creating the transformation scheme, the differential transformation potential of each of the transformation processing elements is checked by previously listing the presence or absence of the differential reversibility between the paired transformation types and referring to it.

In the following, the constraint at the time of creation of the checking transformation parameter will be described. When creating the checking parameter, it is needed to create a parameter that is different from the registration data only for the elements that can be subjected to the differential transformation. In accordance with the differential transformation potential for each element in the transformation scheme that is obtained above, the parameter is changed using random numbers only for an element that can be subjected to the differential transformation, whereas, for an element that is not subjected to the differential transformation, a parameter is created so as to have the same parameter as the registration parameter.

Furthermore, it is also possible to modify a part of the transformation parameter to be created by performing irreversible transformation, such as geometric transformation including degeneracy, a hash function, and elimination of part of an element, in which information is partially lost. This has the advantage in that it is hard to estimate the original biometric feature because the information thereof is lost, and thus the registration data is more strongly protected. However, in contrast, because the information is lost, the differential transformation reversibility is not usually satisfied at the subsequent steps. Furthermore, the accuracy of the checking is reduced. Accordingly, it is preferable that the irreversible transformation is partially implemented at the later transformation steps so as to balance the complexity of the differential transformation. Furthermore, when implementing the irreversible transformation, the checking accuracy is guaranteed by calculating the amount of information occurring at each step and automatically (or manually) adjusting the configuration of the scheme in such a manner that the amount of information becomes appropriate. A commonly used optimization method can be used for the automatic adjustment.

The verification unit 62c verifies the transformation strength and the transformation rate of the configuration of the transformation scheme. For example, if the configuration of the transformation scheme is too simple, i.e., the number of extracted regions is small, the verification unit 62c determines that the strength of the transformation is insufficient. In such a case, the verification unit 62c instructs the transformation scheme creating unit 62b to continue creating the scheme until the transformation strength becomes equal to or greater than a certain strength.

When extracting regions, the verification unit 62c previously prepares a function in which the number of regional elements is large and the strength is higher as the region becomes small. Furthermore, it is also possible to refer to a table in which standard values of the strength are recorded from outside.

Furthermore, the verification unit 62c determines whether the number of processes needed for the transformation process is equal to or less than a certain number. In such a case, in a similar manner as in the above case, the verification unit 62c instructs the transformation scheme creating unit 62b to limit the transformation rate within a certain rate when creating the scheme. To balance between the strength and the rate, the existing optimization method can be used to optimize the strength and the rate.

After creating a scheme from which the differential parameter can be created and parameters for the registration and the checking, the differential parameter creating unit 62d creates a differential parameter that represents the differential transformation between the transformation parameters. Specifically, the differential parameter creating unit 62d, first, creates the registration transformation parameter and the checking transformation parameter (in accordance with the same scheme), obtains the difference between the parameters at each step, and creates the differential parameter.

In the following, a differential parameter creating process will be described using an example 1 of the transformation scheme illustrated in FIG. 17. All parameters for three transformation steps (i.e., the partial cut out transformation, the geometric transformation, and the elements order transformation) in the scheme are parameters that can be used for the differential transformation. To simplify the explanation, a description will be given of a scheme in which a combination of the number of cut-out elements, the cut-out positions of the elements, and the range thereof is fixed, whereas the total "2n" transformation parameters of the "n" rotation parameters $d_0, \ldots, d_{n-1}$ of the elements for the geometric transformation and the "n" elements of the ID interchange association table for the elements order transformation are used as the differential transformation parameters.

Furthermore, as an example of the registration transformation parameter, a combination of the rotation angle values illustrated in Equation (7) below is created for the rotation angle parameters of the "n" elements. As illustrated in Equation (7) below, the rotation angle of the $j^{th}$ element is represented by $dr_j$.

$$dr_0=30 \text{ deg}, dr_1=-40 \text{ deg}, \ldots, dr_{n-5}=-20 \text{ deg}, dr_{n-4}=90 \text{ deg}, \ldots, dr_{n-1}=125 \text{ deg} \quad (7)$$

Furthermore, as an example of the registration transformation parameter, a combination of the integer values illustrated in Equation (8) below is created for the ID interchange parameters of the "n" elements. As illustrated in Equation (8) below, the interchange position of the $j^{th}$ element is represented by $idr_{1j}$.

$$idr_{10}=1, idr_{11}=0, \ldots, idr_{1n-5}=n-4, idr_{1n-4}=n-1, idr_{1n-1}=n-5 \quad (8)$$

As illustrated by Equations (9) and (10) below, it is preferable that this combination of the parameters satisfies two conditions as the properties of the ID interchange parameter: all of the association destinations differ and the ID range of the association destination and the association source are the same.

$$idr_{10} \neq idr_{11} \neq \ldots \neq idr1_{n-1} \quad (9)$$

$$\forall j, 0 \leq idr_{1j} \leq n-1 \quad (10)$$

A well known method for obtaining such a combination of parameters includes a method for interchanging the effective ID values of IDs in a list by using random numbers. By using this, the combination of the parameters is obtained from random numbers and is used as the transformation parameter.

Furthermore, as an example of creating the checking transformation parameter, as illustrated in Equations (11) and (12), the rotation angle of the $j^{th}$ element is represented by $di_j$ and the interchange destination of the $j^{th}$ element is represented by $idi_{1j}$.

$$di_0=80 \text{ deg}, di_1=20 \text{ deg}, \ldots, di_{n-5}=50 \text{ deg}, di_{n-4}=170 \text{ deg}, \ldots, di_{n-1}=-10 \text{ deg} \quad (11)$$

$$idi_{10}=0, idi_{11}=1, \ldots, idi_{1n-5}=n-1, idi_{1n-4}=n-5, \ldots, idi_{1n-1}=n-4 \quad (12)$$

The differential parameter creating unit 62d creates the differential parameter in accordance with the registration transformation parameter and the checking transformation parameter. Specifically, when associating the IDs, the differential parameter creating unit 62d checks the parameters used for the ID interchange; obtains an associated combination in such a manner that the ID of the checking transformation parameter associated with the ID in the registration transformation parameter, and then calculates the difference of the rotation angles for each associated ID combinations.

First, as in the example illustrated in FIG. 18, the differential parameter creating unit 62d associates the element IDs. Various methods are known for associating them, such as a method for sequentially obtaining the association by searching a ID list or a method for creating a hash table at high speed; however, a method suitable for this process depends on the number of elements or whether a buffer for the calculation is arranged.

The differential transformation parameter of the ID parameter is "(0, 1), (1, 0), ..., (n−1, n−4), (n−5, n−1), ..., (n−4, n−5)" (only 0, 1, n−4, n−5, n−1 elements illustrated in FIG. 18 are described and the rest of them are omitted). A pair of element IDs associated with each other is represented in the parentheses: the registration element ID (left) and the checking element ID (right). For example, the checking element ID "0" is associated with the registration element ID "1", and the checking element ID "1" is associated with the registration element ID "0".

Then, as illustrated in FIG. 19, in addition to associating the element IDs, the differential parameter creating unit 62d calculates the difference of the geometric transformation (rotation angle) parameter between the elements associated with each other. The differential parameter creating unit 62d calculates, as the difference rotation angle in accordance with the scheme, the difference that is used for the interchanged checking element ID subjected to the differential transformation.

Because the differential parameter creating unit 62d performs, as a process for calculating the difference rotation angle, the rotation transformation on the registration element before interchanging the element IDs, it is needed to re-read (calculate backwards) the element ID of the angle parameter. The checking element is subjected to the rotation transformation at two steps, i.e., the difference ID transformation and the ID interchange; therefore, two steps of reverse resolution of the ID can be used for associating the rotation parameters.

For example, the differential transformation angle of the transformed zeroth element is the difference between the rotation angle $dr_1$ of a first registration element (before the ID interchange) and the rotation angle $di_1$ of the checking element 1, which is a first registration element of the transformation source of the difference ID and which is obtained before the ID interchange. Then, as illustrated in FIG. 19, the differential parameter creating unit 62d creates, as a differential parameter, the ID association table and the angle difference list.

Figure 20:
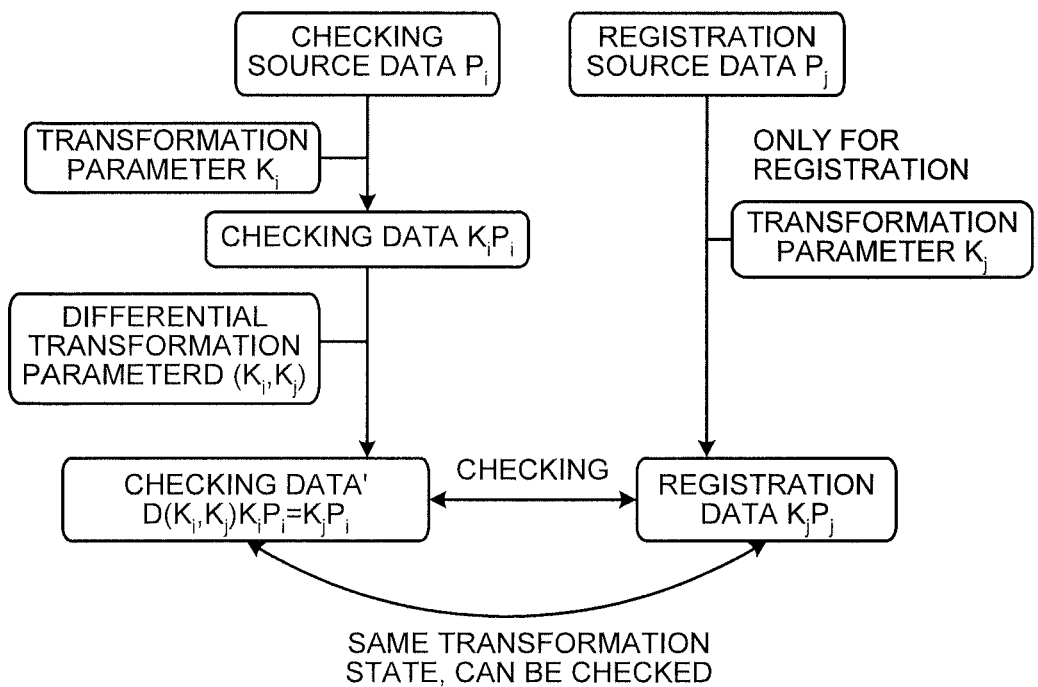
FIG. 20 is a schematic diagram illustrating a data transformation process and a checking process.

Thereafter, the differential parameter creating unit 62d transmits the created differential parameter to the authentication processing device 10. As illustrated in FIG. 20, the authentication processing device 10 transforms the checking data $K_iP_i$, which is transformed using the checking transformation parameter $K_i$, using the differential parameter D ($K_i$, $K_j$), makes the transformation states of the checking data and the registration data the same, and then performs the checking process.

Process Performed by Authentication Processing Device

Figure 21:
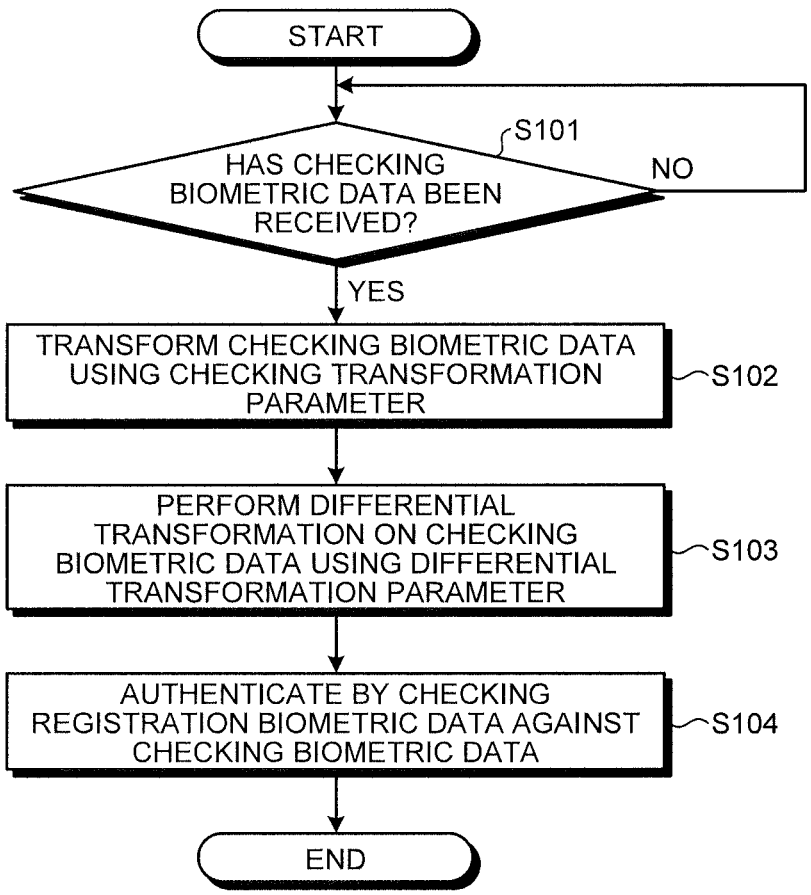
FIG. 21 is a flowchart illustrating the flow of a process performed by the authentication processing device according to the first embodiment.

In the following, a process performed by the authentication processing device 10 according to the first embodiment will be described with reference to FIG. 21. FIG. 21 is a flowchart illustrating the flow of a process performed by the authentication processing device 10 according to the first embodiment.

As illustrated in FIG. 21, the checking biometric information creating unit 11 in the authentication processing device 10 receives the biometric data to be checked from the biometric measuring device 20 (Yes at Step S101). Then, the checking biometric information creating unit 11 transforms the checking target biometric data input from the biometric measuring device 20 by using a checking transformation parameter that is different from a registration transformation parameter (Step S102).

Then, the differential transformation unit 12 reads a differential parameter from the differential transformation parameter DB 14 and performs the differential transformation on the checking biometric data by using the differential parameter (Step S103). Thereafter, the transformation data checking unit 13 checks the differential transformed checking biometric data against the registration biometric data stored in the transformation registration data DB 50 to perform the authentication process (Step S104).

Process Performed by Transformation Parameter Creating Device

Figure 22:
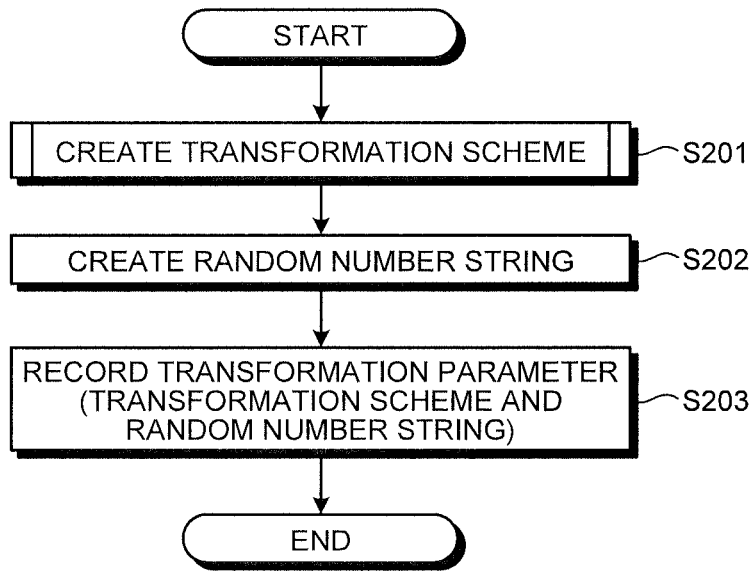
FIG. 22 is a flowchart illustrating the flow of a process performed by the transformation parameter creating device according to the first embodiment.
Figure 23:
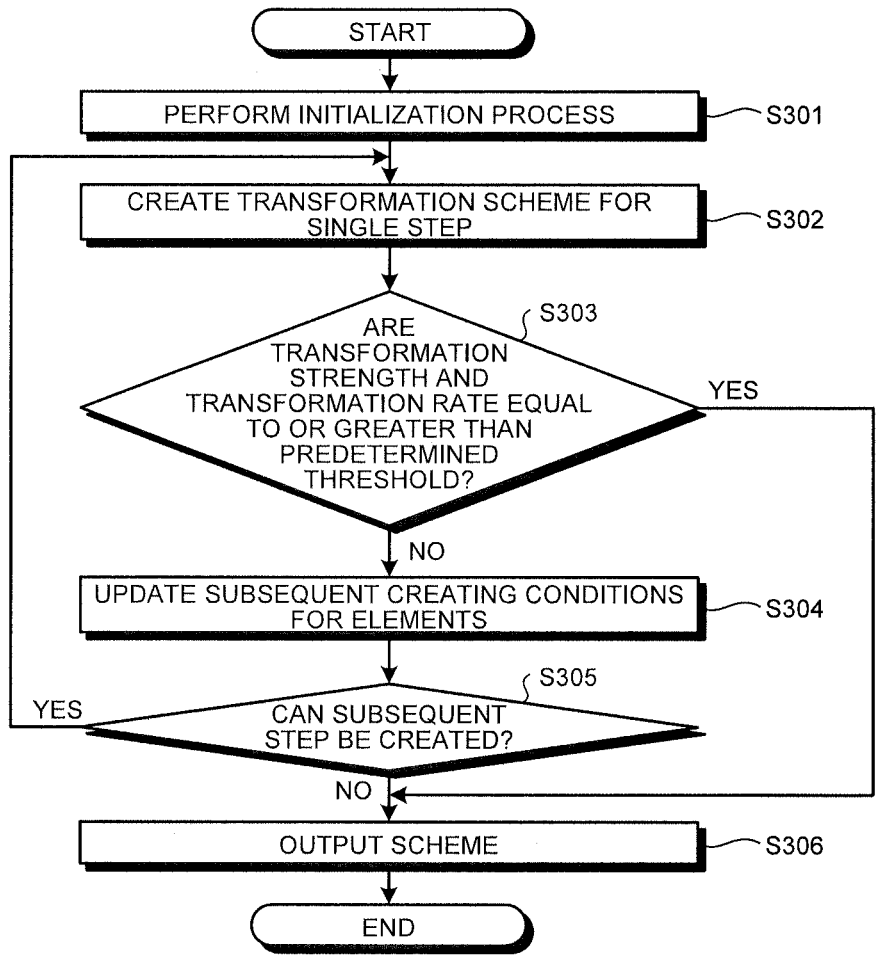
FIG. 23 is a flowchart illustrating the flow of a transformation scheme creating process performed by the transformation parameter creating device according to the first embodiment.
Figure 24:
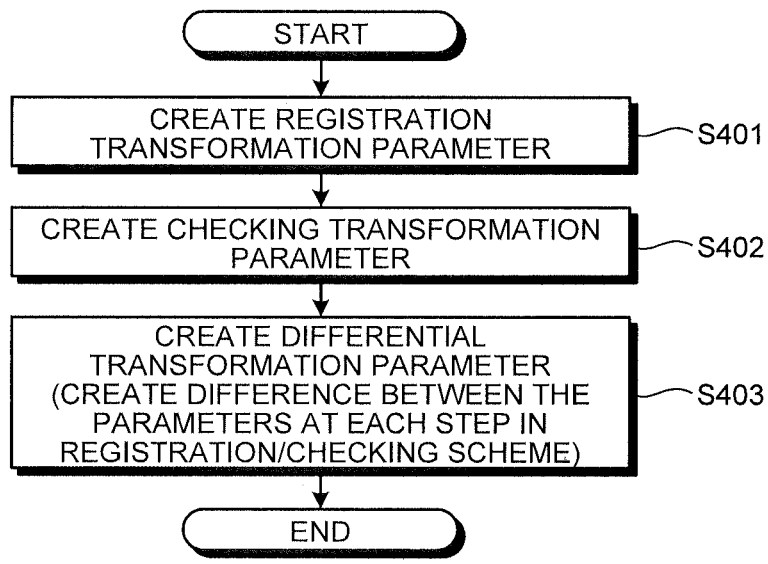
FIG. 24 is a flowchart illustrating the flow of a differential transformation parameter creating process performed by the transformation parameter creating device according to the first embodiment.

In the following, processes performed by the transformation parameter creating device 60 according to the first embodiment will be described with reference to FIGS. 22 to 24. FIG. 22 is a flowchart illustrating the flow of a process performed by the transformation parameter creating device according to the first embodiment. FIG. 23 is a flowchart illustrating the flow of a transformation scheme creating process performed by the transformation parameter creating device according to the first embodiment. FIG. 24 is a flowchart illustrating the flow of a differential transformation parameter creating process performed by the transformation parameter creating device according to the first embodiment.

As illustrated in FIG. 22, the transformation scheme creating unit 62b in the transformation parameter creating device 60 creates a transformation scheme by performing the transformation scheme creating process (this will be described in detail later with reference to FIG. 23) (Step S201). Then, the transformation parameter creating device 60 creates a random number string (Step S202), creates a transformation parameter using the created random number string, and records the transformation parameter (Step S203).

In the following, the transformation scheme creating process performed by the transformation parameter creating device will be described with reference to FIG. 23. As illustrated in FIG. 23, after performing the initialization process (Step S301), the transformation parameter creating device 60 creates a transformation scheme for a single step (Step S302). Then, the transformation parameter creating device 60 determines whether the transformation strength and the transformation rate are equal to or greater than a predetermined threshold (Step S303). If the result of the determination is that the transformation strength and the transformation rate are equal to or greater than the predetermined threshold, the transformation parameter creating device 60 outputs the scheme (Step S306).

Furthermore, if the transformation strength and the transformation rate are not equal to or greater than the predetermined threshold (e.g., the strength is insufficient), the transformation parameter creating device 60 updates the subsequent creating conditions for elements (Step S304). Then, the transformation parameter creating device 60 determines whether the subsequent step can be created by determining whether the differential reversibility condition is satisfied (Step S305).

If the result of the determination is that the subsequent step can be created (Yes at Step S305), the transformation parameter creating device 60 returns to Step S302, creates a transformation scheme for one step, and repeats the processes described above (Steps S302 to S305). In contrast, if the transformation parameter creating device 60 determines that the subsequent step is not created (No at Step S305), the transformation parameter creating device 60 outputs the scheme (Step S306).

In the following, the differential transformation parameter creating process performed by the transformation parameter creating device will be described with reference to FIG. 24. As illustrated in FIG. 24, the transformation parameter creating device 60 creates a registration transformation parameter (Step S401) and a checking transformation parameter (Step S402). Then, for the registration transformation parameter and the checking transformation parameter, the transformation parameter creating device 60 calculates the difference between the parameters at each step and creates a differential parameter (Step S403).

Process Performed by Biometric Information Transformation Device

Figure 25:
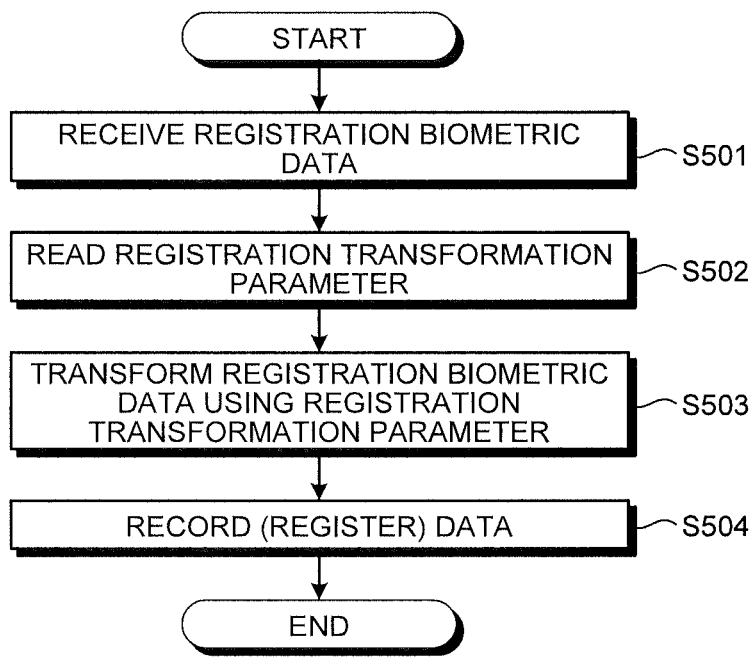
FIG. 25 is a flowchart illustrating the flow of a process performed by a biometric information transformation device according to the first embodiment.

In the following, a process performed by the biometric information transformation device 40 according to the first embodiment will be described with reference to FIG. 25. FIG. 25 is a flowchart illustrating the flow of a process performed by a biometric information transformation device according to the first embodiment. As illustrated in FIG. 25, when receiving the registration biometric data from the biometric measuring device 20 (Step S501), the biometric information transformation device 40 reads the registration transformation parameter from the transformation parameter DB 30 (Step S502). Then, the biometric information transformation device 40 transforms the registration biometric data using the registration transformation parameter (Step S503) and stores it in the transformation registration data DB 50 (Step S504).

Advantage of First Embodiment

As described above, the authentication processing device 10 receives biometric data to be checked from the biometric measuring device 20, transforms the checking target biometric data received from the biometric measuring device 20 by using a checking transformation parameter that is different from a registration transformation parameter, and creates checking biometric data. Then, the authentication processing device 10 performs the differential transformation process on the created checking biometric data by using the differential parameter that makes the transformation state transformed by the checking transformation parameter and the transformation state transformed by the registration transformation parameter the same. Thereafter, the authentication processing device 10 checks the transformed checking biometric data against the registration biometric data stored in the transformation registration data DB 50 in order to perform the authentication. In this way, with the authentication processing device 10, because the transformation parameter of the registration data is not checked at the time of the checking process, it is hard for the transformation parameter to be leaked and be estimated; therefore, the security of the registered biometric data is enhanced. Furthermore, because the registration data is not necessarily transformed every time it is checked, the processing loads can be reduced and thus a high-speed checking process is possible.

Furthermore, according to the first embodiment, the checking biometric data is transformed by using, as the checking transformation parameter, local feature information that is biometric feature information on a local space containing a plurality of phases; a base coefficient obtained by performing the base transformation on the entire or the partial local space; a geometric transformation variable; or the sequential order of the elements of the biometric information, or any combination thereof. Accordingly, it is possible to transform the biometric data used for the authentication to data that is difficult to decrypt.

Furthermore, according to the first embodiment, the differential transformation parameter is created in accordance with the checking transformation parameter and the checking biometric data is transformed using the created differential transformation parameter. In this way, because the checking transformation parameter and the differential transformation parameter are created in advance, a high-speed checking process is possible.

Furthermore, according to the first embodiment, the biometric data transformed by using any one of the transformation variables of a plurality of transformation parameters, which is used as the registration transformation parameter, is stored as registration biometric data. Accordingly, a plurality of transformation parameters can be previously prepared and the biometric data can be transformed by using any one of the transformation variables. This makes it possible to eliminate the parameter creating process for each checking, and thus to enhance the security of the registered biometric data while keeping the processing at high speed. Furthermore, particularly when performing one-to-N checking, by grouping the registration data for each transformation parameter to be used, it is possible to reduce the number of the differential transformation processes to be used for the checking transformation data at the time of checking to be equal to the number of groups, thus further improving the processing speed.

Furthermore, according to the first embodiment, because the registration transformation parameter and the checking transformation parameter are created as irreversible transformation parameters, it is harder to decrypt the transformed data, thus enhancing the security of the biometric data.

Furthermore, according to the first embodiment, the transformation variable is created as the registration transformation parameter and the checking transformation parameter in such a manner that the transformation strength of the transformed biometric data is equal to or greater than a predetermined threshold. Accordingly, the security of the biometric data can be ensured.

Furthermore, according to the first embodiment, the transformation variable is created as the registration transformation parameter and the checking transformation parameter in such a manner that the transformation time needed for the transformation of the biometric data is within a predetermined threshold. Accordingly, the time needed for the transformation process can be adjusted.

[b] Second Embodiment

The first embodiment of the present invention has been described above; however, the present invention is not limited to the embodiment described above and can be implemented with various kinds of embodiments other than the embodiments described above. Accordingly, in the following, another embodiment included in the present invention will be described below as a second embodiment.

(1) Creation of Differential Parameter

In the first embodiment, a case is described in which the registration transformation parameter and the checking transformation parameter are previously created and the differential parameter is created from the registration transformation parameter and the checking transformation parameter; however, the embodiment is not limited thereto. For example, it is also possible to create the checking biometric data using the checking transformation parameter created in accordance with the differential transformation parameter. Specifically, the checking transformation parameter is crated from the registration transformation parameter and the differential parameter. Furthermore, it is also possible to create the registration transformation parameter from the checking transformation parameter and the differential parameter.

Figure 26:
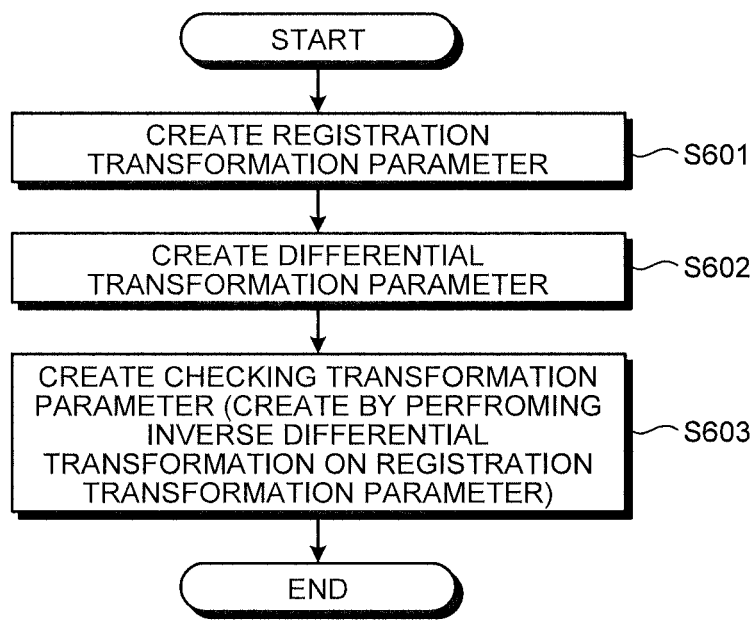
FIG. 26 is a flowchart illustrating the flow of a differential transformation parameter creating process performed by a transformation parameter creating device according to a second embodiment.

A case will be described here in which the checking transformation parameter is created from the registration transformation parameter and the differential parameter. As illustrated in FIG. 26, the transformation parameter creating device creates the registration transformation parameter (Step S601) and creates the differential transformation parameter (Step S602). Then, by using random numbers, the transformation parameter creating device creates the differential parameter, which is used at each step, with respect to the registration transformation parameter; uses the created differential parameter for the registration transformation parameter; and creates the checking transformation parameter (Step S603).

In the following, a checking transformation parameter creating process will be described in detail. Here, a case will be described in which, as the differential parameter, the ID association table is "(0, 1), (1, 0), . . . , (n−1, n−4), (n−5, n−1), . . . , and (n−4, n−5)" and the angle difference list is "(−60 deg), (−50 deg), . . . , (−190 deg), (−70 deg), and (−80 deg)".

The transformation parameter creating device performs, as the checking transformation parameter creating process, the ID interchange and backward calculation of the rotation angle parameter. Specifically, in the ID association table for the differential parameter, the checking element ID (after transformation) that is associated with the registration element ID "0" (after transformation) is 1, and the parameter of 0, which corresponds to the parameter of the registration element ID for the interchange and which is obtained after the transformation, is $idr_{11}=0$; therefore, the parameter of 0 is associated with the registration element ID 1 that is obtained before the ID interchange. Because it is preferable that the cut-out position (the original ID) is the same between the associated elements, it is associated with the checking element ID "1" (before transformation). Accordingly, $idi_{11}=1$ is given. Furthermore, the rotation angle of the element is obtained by subtracting the angle difference from the registered rotation angle, thus Equation (13) below is derived.

$$di_1 = dr_0 - dd_0 = 30 \text{ deg} - 10 \text{ deg} = 20 \text{ deg} \quad (13)$$

By repeatedly performing the above process on all of the element, the transformation parameter creating device can obtain the checking transformation parameter as given by Equations (14) and (15) below:

$$di_0 = 80 \text{ deg}, di_1 = 20 \text{ deg}, \ldots, di_{n-5} = 50 \text{ deg}, di_{n-4} = 170 \text{ deg}, \ldots, di_{n-1} = -10 \text{ deg} \quad (14)$$

$$idi_{10} = 0, idi_{11} = 1, \ldots, idi1_{n-5} = n-1, idi1_{n-4} = n-5, \ldots, idi1_{n-1} = n-4 \quad (15)$$

Furthermore, when creating the registration transformation parameter from the checking transformation parameter and the differential parameter, the differential parameter between the checking transformation parameters is created using random numbers used at each step, the created differential parameter is inversely used for the checking transformation parameter, and then the registration transformation parameter is created. The creating process in detail is the same as that used when creating the checking transformation parameter from the registration transformation parameter and the differential parameter.

As described above, because the checking biometric data is created by using the checking transformation parameter in accordance with the differential transformation parameter, the checking transformation parameter is created every time the checking is performed without previously preparing the differential transformation parameter. Accordingly, the complexity of the checking transformation parameter is high, thus enhancing the security of the checking biometric data. Furthermore, when compared with a case in which the differential transformation parameter is created from the registration transformation parameter and the checking transformation parameter, the differential transformation parameter can be easily created; therefore, it is possible to further improve the processing speed.

(2) Transformation Scheme

In the first embodiment, a case has been described in which the transformation scheme is dynamically created; however, the first embodiment is not limited thereto. For example, it is also possible to create the transformation scheme outside and record it in a device. Specifically, one or more types of transformation scheme are previously created outside and are recorded in the transformation parameter creating device.

(3) System Configuration, etc.

The components of each unit illustrated in the drawings are only for conceptually illustrating the functions thereof and are not necessarily physically configured as illustrated in the drawings. In other words, the specific shape of a separate or integrated unit is not limited to the drawings; however, all or part of the unit can be configured by functionally or physically separating or integrating any of the units depending on various loads or use conditions. For example, the authentication processing device 10 can be integrated with the transformation parameter creating device 60. Furthermore, all or any part of the processing functions performed by each device can be implemented by a CPU and by programs analyzed and executed by the CPU or implemented as hardware by wired logic.

Furthermore, of the processes described in the embodiments, the whole or a part of the processes that are mentioned as being automatically performed can be manually performed or the whole or a part of the processes that are mentioned as being manually performed can be automatically performed using known methods. Furthermore, the process procedures, the control procedures, the specific names, and the information containing various kinds of data or parameters indicated in the above specification and drawings can be arbitrarily changed unless otherwise noted.

(4) Program

Figure 27:
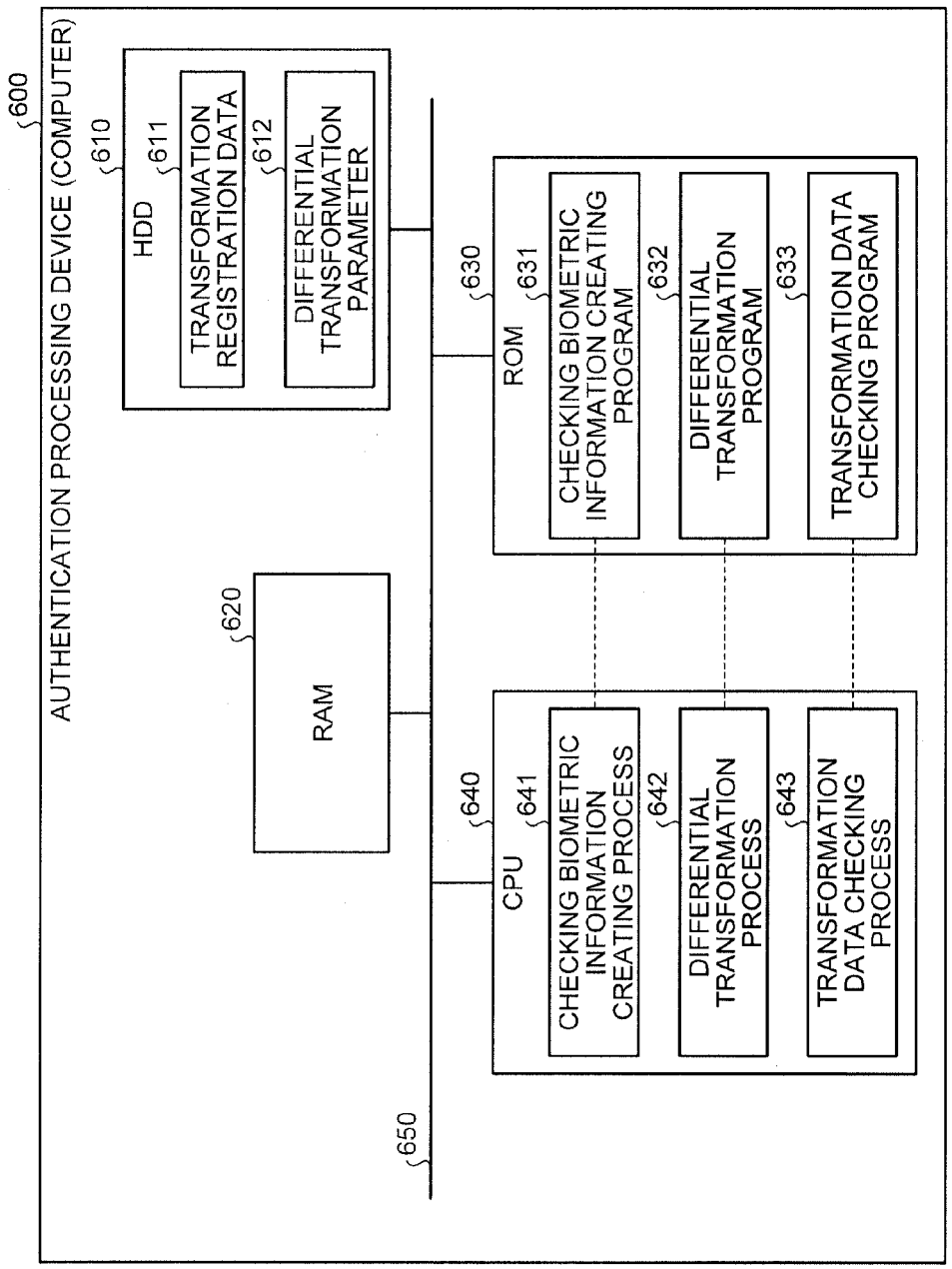
FIG. 27 is a block diagram illustrating a computer that executes an authentication processing program.

The various processes described in the embodiments described above can be implemented by programs prepared in advance and executed by a computer. Accordingly, in the following, a computer that executes the same function performed by the apparatus in the above embodiments will be described as an example using FIG. 27. FIG. 27 is a block diagram illustrating a computer that executes an authentication processing program.

As illustrated in FIG. 27, a computer 600 functioning as an authentication processing device includes an HDD 610, a RAM 620, a ROM 630, and a CPU 640, which are connected via a bus 650.

The ROM 630 stores therein, in advance, an authentication processing program having the same function as that in the embodiments described above, i.e., as illustrated in FIG. 27, a checking biometric information creating program 631, a differential transformation program 632, and a transformation data checking program 633. The programs 631 to 633 can appropriately be integrated or separated in the same manner as the components of the authentication processing device illustrated in FIG. 11.

As illustrated in FIG. 27, because the CPU 640 reads the programs 631 to 633 from the ROM 630 and executes them, the programs 631 to 633 function as a checking biometric information creating process 641, a differential transformation process 642, and a transformation data checking process 643, respectively. The processes 641 to 643 correspond to, respectively, the checking biometric information creating unit 11, the differential transformation unit 12, and the transformation data checking unit 13 illustrated in FIG. 11.

Furthermore, as illustrated in FIG. 27, the HDD 610 stores therein transformation registration data 611 and a differential transformation parameter 612. Then, the CPU 640 registers data of the transformation registration data 611 and the differential transformation parameter 612; reads data from the transformation registration data 611 and the differential transformation parameter 612 and stores them in the RAM 620; and performs the process in accordance with the data stored in the RAM 620.

According to an embodiment of the invention, the disclosed apparatus can advantageously perform a checking process at high speed while improving the security of biometric data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus comprising:
a memory storing, as registration biometric information, biometric information that is transformed by using a first transformation variable; and
a processor coupled to the memory, wherein the processor executes a process comprising:
first transforming, by using a second transformation variable, biometric information that is an input checking target to create checking biometric information;
second transforming the checking biometric information created at the first transforming biometric information by using a differential transformation variable by which a transformation state of the registration biometric information generated by the first transformation variable and a transformation state of the checking biometric information generated by the second transformation variable have a same state; and
checking the checking biometric information transformed at the second transforming the checking biometric information against the registration biometric information stored in the registration biometric information storing unit to perform authentication, wherein
the first transforming biometric information creates the checking biometric information by using the second transformation variable that is created in accordance with the differential transformation variable.

2. The biometric authentication apparatus according to claim 1, wherein the second transforming the checking biometric information transforms the checking biometric information by using, as the differential transformation variable, local feature information that is biometric feature information on a local space containing a plurality of phases, a base coefficient obtained by performing a base transformation on an entire space or a partial local space, a geometric transformation variable, or a sequential order of elements of biometric information, or any combination thereof.

3. The biometric authentication apparatus according to claim 1, the processor further executes a process comprising creating the differential transformation variable in accordance with the second transformation variable, wherein the checking biometric information is transformed by using the differential transformation variable created by the creating the differential transformation variable.

4. The biometric authentication apparatus according to claim 1, wherein the memory stores therein, as the registration biometric information, the biometric information that is transformed by using any of transformation variables as the first transformation variable.

5. The biometric authentication apparatus according to claim 1, the processor further executes a process comprising creating the first transformation variable and the second transformation variable as irreversible transformation variables.

6. The biometric authentication apparatus according to claim 1, the processor further executes a process comprising creating the first transformation variable and the second transformation variable in such a manner that a transformation strength of the transformed biometric information is equal to or greater than a predetermined threshold.

7. The biometric authentication apparatus according to claim 1, the processor further executes a process comprising creating the first transformation variable and the second transformation variable in such a manner that a time needed for the first transforming the biometric information is equal to or less than a predetermined threshold.

8. The biometric authentication apparatus according to claim 3, wherein the creating the differential transformation variable determines whether the first transformation variable and the second transformation variable enable to be used for differential transformation and allocates a differential transformable variable to create the differential transformation variable.

9. A biometric authentication method comprising:
storing, as registration biometric information in a registration biometric information storing unit, biometric information that is transformed by using a first transformation variable;
first transforming, using a processor, by using a second transformation variable, biometric information that is an input checking target to create checking biometric information;
second transforming, using a processor, the checking biometric information created at the first transforming biometric information by using a differential transformation variable by which a transformation state of the registration biometric information generated by the first transformation variable and a transformation state of the checking biometric information generated by the second transformation variable have a same state; and
checking, using a processor, the checking biometric information transformed at the second transforming the checking biometric information against the registration biometric information stored in the registration biometric information storing unit to perform authentication, wherein
the first transforming biometric information creates the checking biometric information by using the second transformation variable that is created in accordance with the differential transformation variable.

10. A non-transitory computer readable storage medium that stores therein a biometric authentication program causing a computer to execute a process comprising:
- storing, as registration biometric information in a registration biometric information storing unit, biometric information that is transformed by using a first transformation variable;
- first transforming, by using a second transformation variable, biometric information that is an input checking target to create checking biometric information;
- second transforming the checking biometric information created at the first transforming biometric information by using a differential transformation variable by which a transformation state of the registration biometric information generated by the first transformation variable and a transformation state of the checking biometric information generated by the second transformation variable have a same state; and
- checking the checking biometric information transformed at the second transforming the checking biometric information against the registration biometric information stored in the registration biometric information storing unit to perform authentication, wherein
- the first transforming biometric information creates the checking biometric information by using the second transformation variable that is created in accordance with the differential transformation variable.

* * * * *